United States Patent [19]

Gilbert et al.

[11] Patent Number: 5,530,848

[45] Date of Patent: Jun. 25, 1996

[54] SYSTEM AND METHOD FOR IMPLEMENTING AN INTERFACE BETWEEN AN EXTERNAL PROCESS AND TRANSACTION PROCESSING SYSTEM

[75] Inventors: Peter W. Gilbert, Midland; Matthew M. Diment, Beaverton; Brian J. Walters, Midland, all of Mich.; Reiner Burton, Schwetzingern, Germany

[73] Assignee: The Dow Chemical Company, Midland, Mich.

[21] Appl. No.: 961,271

[22] Filed: Oct. 15, 1992

[51] Int. Cl.[6] .......................... G06F 13/00; G06F 15/00; G06F 3/00

[52] U.S. Cl. .................. 395/600; 395/200.20; 395/835; 395/838; 395/839; 364/DIG. 1; 364/131; 364/138; 364/282.1; 364/284.3; 364/276.8

[58] Field of Search ................................. 395/600, 575, 395/200, 200.20, 835, 838, 839; 364/DIG. 1

[56] References Cited

U.S. PATENT DOCUMENTS

| | | | |
|---|---|---|---|
| 4,603,400 | 7/1986 | Daniels | 364/900 |
| 4,642,791 | 2/1987 | Mallozi et al. | 364/900 |
| 5,291,594 | 3/1994 | Selliguchi | 395/600 |
| 5,331,538 | 7/1994 | DiGiulio et al. | 364/134 |
| 5,363,121 | 11/1994 | Freund | 395/600 |

OTHER PUBLICATIONS

Ancilott, "A Distributed Commit Protocol for a Multicomputer System" 1990, pp. 718–724, IEEE.
Ng, "A Commit Protocol for Checkpointing Transactions" 1988 IEEE, pp. 22–31.
Ghafoor, "An Efficient Communication Structure for Distributed Commit Protocols", 1989 IEEE pp. 375–388.

Primary Examiner—Thomas G. Black
Assistant Examiner—Jean R. Homere
Attorney, Agent, or Firm—Sterne, Kessler, Goldstein & Fox

[57] ABSTRACT

A system and method for interfacing external processes to a transaction processing system. An interface system is provided that accepts input messages from external processes wherein in the input messages are to be processed by a transaction processing system. The interface system logs received messages and notifies the transaction processing system that a message has been received for processing. The interface system sends a confirmation to the external process indicating that the message has been received. The interface system periodically examines the status of each message as it is being processed by the transaction processing system. Output status messages indicative of such status are created, stored, and sent to an external destination for informational purposes. Outbound data messages are created, stored and sent to an external application. The interface system is event driven, but includes a monitor subsystem to time the start-up of certain processes at periodic intervals.

30 Claims, 23 Drawing Sheets

FIG. 12

```
TRAN YSPO      A66ACX3      POST OFFICE STATUS CHECK            04/07/92  09:15:21

------TIME STAMPS------
FILE TYPE:    PR                      CREATE 04/03/92  09:45:42          SEGMENT ID:       Y2
BATCH NO:     POMTL                   UPDATE 04/03/92  09:46:40          SEGMENT LENGTH:  364
SERIAL NO:    00001781
DATA FORMAT:  YSRCMAPU                                                   CLIENT:       10
                                                                         DOW US AREA
SENDING NODE: A01F            ACKNOWLEDGE NODE: A01F                     POST OFFICE: A665
TRANSACTION:  I050            TRANSACTION:      I059                     TRANSACTION: PODD

ODC USERID: POMTL 001781             NOTIFY: 0065615                     RETURN LENGTH:   100

------STATUS------      ------BULK------------
FLAGS: NOTIFY SOMEONE: Y              POST OFF:     C         --PHASE 1--    --PHASE 2--
       BULK MAIL:                     SAP STATUS:   WW        GOOD:    0     GOOD:     0
       EXPRESS MAIL:                  SAP ERROR:   052        ERROR:   0     ERROR:    0
       NO STORE & FWD:
       SEND WHAT STAT:     1                                             ABAP REPORT NAME:
       CHAIN MAIL:         Y           BULK RECS           0             ABAP UPDATE DATE:
       ABORT FLAG:                                                                VERSION:
       COM FLAG:           1
ERR: RECORD EXISTS WITH THE SAME DATA/ NO CHANGE

OK                                                                                 1 - 120
              PF:  3=BACK  4=RETURN  12=PRINT
```

FIG. 13

```
TRAN YSPO          A66DCX3        POST OFFICE CONTROL RECORD         04/07/92 10:02:43

FILE TYPE:    PC              -------TIME STAMPS-------             SEGMENT ID:      Y2
                              REORG   04/06/92  23:46:01            SEGMENT LENGTH: 557
                              STARTUP 04/06/92  23:49:20
                              EXECUTE 04/07/92  10:02:33

LAST ASSIGNED    BATCH NUMBER:   P08382        SERIAL NUMBER: 00002185
HIGH RBA ON APLZ: 01030464

PI1 CYCLE TIME:   00:00:45        P04 TIMEOUT: 00:10        ODC THRESHOLD: 0010
LAST ODC FINISHED: 04/07/92 10:00:20   TRACE SW: N  BLOCK P05 SW: N
MAX OUTBOUND TASKS:: 003         OUTBOUND SLOWDOWN COUNT: 010

VERSION CONTROL AND USEAGE:
  --P01  04/06/92 12.05.19        0        --D01  02/21/92 10.29.08       0
  --P02  02/21/92 10.00.47      240        --S02  01/03/92 16.13.23       1
  --P04  02/25/92 16.23.04      789        --PX1  01/03/92 16.09.22     790
  --P05  01/13/92 17.05.20      789        --PX2  02/25/92 13.52.44       0
  --P08  04/02/92 12.00.39        0        --POC  01/03/92 16.09.44     789
                                           --POD  01/15/92 11.16.35       0

OK         PF3= BACK                                                   1 -  125
```

FIG. 20

TRAN YSPO   A66ACX3   POST OFFICE STATUS CHECK   04/07/92   09:06:52

| | TYPE | BATCH# | SERIAL NO# | ABAP NAME | CHAIN | BULK# | PO | SAP | EXT | DATE | TIME |
|---|---|---|---|---|---|---|---|---|---|---|---|
| 1 | PN | P00497 | 00001127 | YSRBLOGB | -- | 9 | 6 | | 0 | 03/10/92 | 16:06:10 |
| 2 | PN | P0AAAA | 00000001 | YSTIMRRR | -- | 55 | 2 | | | 04/07/92 | 09:00:43 |
| 3 | PR | POHTL | 00001780 | YSRCHABA | -Y- | 0 | C | FO | 000 | 04/03/92 | 09:46:40 |
| 4 | PR | POHTL | 00001781 | YSRCHAPU | -Y- | 0 | C | WW | 052 | 04/03/92 | 09:46:40 |
| 5 | PR | POHTL | 00001782 | YSTFXTOO | -Y- | 0 | C | FO | 000 | 04/03/92 | 09:47:24 |
| 6 | PR | POHTL | 00001783 | YSRCHABA | -Y- | 0 | C | FO | 052 | 04/03/92 | 09:47:24 |
| 7 | PR | POHTL | 00001784 | YSRCHAPU | -Y- | 0 | C | WW | 000 | 04/03/92 | 09:47:24 |
| 8 | PR | POHTL | 00001785 | YSTEXTOO | -Y- | 0 | C | FO | 000 | 04/03/92 | 09:47:24 |
| 9 | PR | POHTL | 00001812 | YSRCHABA | -Y- | 0 | C | FO | 000 | 04/03/92 | 14:34:26 |
| 10 | PR | POHTL | 00001813 | YSTEXTOO | -Y- | 0 | C | FO | 052 | 04/03/92 | 14:34:26 |
| 11 | PR | POHTL | 00001814 | YSRCMASA | -Y- | 0 | C | WW | 000 | 04/03/92 | 14:35:11 |
| 12 | PR | POHTL | 00001815 | YSTEXTOO | -Y- | 0 | C | FO | 000 | 04/03/92 | 14:35:11 |
| 13 | PR | POHTL | 00001816 | YSRCMAPU | -Y- | 0 | C | WW | 052 | 04/03/92 | 14:35:56 |
| 14 | PR | POHTL | 00001817 | YSTEXTOO | -Y- | 0 | C | FO | 000 | 04/03/92 | 14:35:56 |
| 15 | PR | POHTL | 00001818 | YSRCHABA | -Y- | 0 | C | FO | 000 | 04/03/92 | 14:36:41 |
| 16 | PR | POHTL | 00001819 | YSRCMASA | -Y- | 0 | C | FO | 000 | 04/03/92 | 14:36:41 |
| 17 | PR | POHTL | 00001820 | YSRCMAPU | -Y- | 0 | C | WW | 052 | 04/03/92 | 14:36:41 |

PP: 2=SELECT, 3=BACK, 12=PRINT, ENTER=REFRESH

```
TRAN YSPO    A66ACX3    POST OFFICE STATUS CHECK    03/25/92 13:30:59

RECORD TYPE:  P*                   --RECORD COUNTS--
            BATCH NO  =   *                    TYPE  STATUS  COUNT
            SERIAL NO >   -                    PO      1       0
            ABAP NAME =   *                    PO      2       0
            UPDATED SINCE:                     PO      3       1
                DATE : 03/25/92                PO      4       0
                TIME : 00:00:00                PO      8       0
                                               PO      9       0

CLIENT:                            PO     ALL      0

1  -  100

OK
```

SYSTEM AND METHOD FOR IMPLEMENTING AN INTERFACE BETWEEN AN EXTERNAL PROCESS AND TRANSACTION PROCESSING SYSTEM

BACKGROUND OF THE INVENTION

1. Field of the Invention

The present invention relates generally to computer interfaces, and more particularly to a system and method for interfacing to a transaction processing system.

2. Related Art

Current developments in computer and computer-related technology have resulted in the utilization of computers in numerous business applications. Almost every facet of today's industry is implemented using computers and computer systems in some manner. Computerization has become necessary for businesses to remain in a competitive posture.

Computer systems are used to automate processes, keep track of large quantities of information, and provide fast, flexible communications. One area of application that enjoys widespread computerization is that of business transactions. Many businesses from small 'mom and pop' stores, to professional offices and partnerships, to large corporations have computerized their business transactions to some extent. Transactions that have been computerized include billing, order-taking, and inventory control, etc. Computers are used in these transactions to perform a variety of functions.

The following scenario provides an example of a computerized business transaction. The computer system accepts an order from an external source. The external source may be a computer at a customer's facility, a computer at a regional sales office, or a manual keyboard entry at a system terminal. Along with materials and quantities ordered, a customer identification number is included. The system uses this number to look up certain information about the customer such as billing address, credit limit, shipping address, etc. The credit limit can be compared with an outstanding balance for that customer as recorded in an accounting database. If the order will cause the customer to exceed its credit limit, the transaction may be prohibited or flagged for authorization.

Specific order information regarding materials and quantity requested is compared with an inventory database indicating the availability of the requested materials. Based on this information a reply is sent to the customer indicating the delivery schedule.

The system sends a message to the warehouse detailing the specifics of the order. The warehouse prepares the order and ships it to the customer at the address specified on the order. In an automated warehouse setting, order selection and preparation is performed by a computerized system as well.

Once the order is prepared and sent, the computer system updates an accounts receivable database, and an invoice is sent to the customer at the billing address. When the customer tenders payment, the accounts receivable database is updated.

There are many integrated software application packages available to perform a wide range of business functions, including those discussed above. These packages are generally referred to in this document as transaction processing software packages. One such package is the SAP R/2 System available from SAP America, Inc., 625 North Governor Printz Blvd., Essington, Pa. 19029.

The SAP R/2 System is a transaction processing system designed to run in an IBM CICS (customer interface control system) or IMS environment. SAP uses services of the host computer where necessary. For example, SAP may use CICS to interface with terminals, printers, databases or external communications facilities such as IBM's Virtual Telecommunications Access Method (VTAM).

SAP is a modularized, table driven system that uses transactions to perform specified functions. These functions may include order processing, inventory control and invoice validation; financial accounting, planning and control; production planning and control; and project accounting planning and control. The modules are all fully integrated with one another, allowing for integrated operations.

SAP internal functions are performed using its own high-level programming language, ABAP4. ABAP4 is also available to allow users to create specialized application functions and reports. ABAP4 is a fourth generation programming language with a tightly integrated data dictionary.

SAP operates in two modes, online and batch. Interface tools are available in SAP to allow other application software, such as external processes or applications, to be interfaced to the SAP system using the online and/or the batch modes. For example, a purchasing application software package at a regional manufacturing plant may be interfaced to the SAP at a corporate headquarters office to allow automated entry of raw material receipts.

The SAP system provides a number of unique interface tools that an external application can use to communicate with the SAP system. The external applications use these tools to send messages to the SAP system for subsequent action. In this patent document, the term "message" is used to refer to data signals transmitted between external applications and the transaction processing system. Each message can include data to be sent to the transaction processing system and instructions telling the transaction processing system how to operate on that data.

However, conventional SAP-provided interface tools have several major shortcomings. For example, in the online mode, when a message (an order, for example) is transmitted to SAP from an external application there is no acknowledgment. In the case of an order, the order data enters a transient data queue of CICS and cannot be tracked or managed. In this environment, the external application cannot determine the status of its order, or even whether the order was received by SAP.

Another shortcoming of conventional SAP interface tools is that portions of the SAP online system are shut down to perform batch write operations. Consequently, the online transactions cannot be used during a batch input session. Conventional SAP interfaces have worked around this shortcoming by providing two batch input files. One batch input file is for online inputs, while the other is for batch inputs. This solution of maintaining two databases results in increased flexibility, but batch interfaces can only be entered into the databases when the online system is not being used.

Further, conventional SAP interface tools require screen buffers that match the terminal screen layouts. This requires that a screen layout definition be exported from SAP to the external application. With this kind of interface, when the SAP system changes input screen requirements, all external processes must change the way they generate screens.

These interfacing problems are not limited to interfaces with the SAP system, but apply to interfaces to transaction processing systems in general and interfaces between business software applications. What is needed is a system and method for interfacing to a transaction processing system that overcomes the shortcomings of the SAP-provided interface tools. More specifically, what is needed is an interface to the SAP system that provides acknowledgment to external applications upon receipt of a message, and provides tracking and management of the message as it is processed through the transaction processing system.

Confirming receipt of a message from an external application would allow the external application to maintain an awareness of the status of the message sent to the transaction processing system. In this manner, the external application would know when its message is received by the transaction processing system, where that message is in the transaction processing process, and whether that message needs to be resubmitted due to a data or time-out error.

What is further needed is a transaction processing interface that allows external applications to submit batch input files to the transaction processing system in the on-line mode.

SUMMARY OF THE INVENTION

The present invention provides a system and method for interfacing an external process or processes to a transaction processing (transaction processing) system. The invention provides guaranteed delivery and processing of messages received from external applications and provides acknowledgment to an external application when a message is received. Additionally, the interface system provides for tracking and status monitoring of messages during their processing. Acknowledgment is provided to the external application when the processing is complete.

The interface system according to a preferred embodiment comprises seven subsystems that each perform a designated process. The processes comprise a group of software instructions referred to as a module. Some processes comprise multiple modules. According to the present invention, a message is received at an input module from an external application. Three types of input-receive modules are provided to perform the input process. These modules are designed to handle (1) online inputs from external computer environment such as a Digital Equipment Corp. VAX computer, (2) online inputs from an external CICS region environment, and (3) batch job inputs. Once a message is received by an input receive module, the message is logged in a log file as a control record for that message.

The interface system also comprises three data files. One is an interface system log file, which is used to store both data records for bulk data messages and control records for all messages. The interface system log file is one physical file, but is treated as two separate logical data bases. This treatment facilitates separation into separate physical files should performance needs require such a separation. There is also an outbound communications log file and a 'match' file. The match file is used to match records in the transaction processing system's transaction log with records in the interface log file to determine the outcome of message processing in the transaction processing system.

A key feature of the invention is that a confirmation message is provided back to an external application when an input message is received from that external application. The confirmation message indicates that the message was received. Thus, the external application knows that its input message was received by the transaction processing system or, if no confirmation is received, that the input message must be retransmitted. As a result, the efficiency and integrity of system operations is enhanced because an external application is quickly informed as to whether it needs to retransmit an input message.

A trigger subsystem is provided to run a trigger process. The trigger process indicates to the transaction processing system that an input message has been received. Upon initiation, the trigger process interrogates the log file to determine when an input message is available for delivery to the transaction processing system.

When an input message is available, the trigger process sends the input message to the transaction processing system indicating such receipt. This message is referred to as a trigger message. The trigger message indicates where the transaction processing system can find the control record in the log file.

The trigger message indicates to the transaction processing system that a message has been received by the interface system and is ready to be processed. The transaction processing system may then commence with processing the message.

A status subsystem provides a status process that updates status records indicating the status of an input message as it is processed by the transaction processing system. The status subsystem also adds new control records to the log file. These control records are stored in the log file.

An acknowledgment subsystem performs an acknowledgment process in which the status of input message processing is sent back to the external application. The acknowledgment process queries the log file to determine the status of transaction processing of received input messages. For each input message being processed, the acknowledgment process creates an acknowledgment message and stores it in an outbound communication file for subsequent transmission to an external application.

A communications subsystem is provided to send outbound messages from the interface system to each original external application or to a location defined as a destination to receive such acknowledgments for an external application. Multiple outbound communication processes may exist concurrently. A communications monitor subsystem is provided to run, control, and manage the outbound communication processes.

The interface system according to the present invention handles three classes of messages. These include regular messages, chain messages, and bulk messages. Regular messages comprise independent messages complete within themselves and are delivered independent of any other message. For each regular message, one control record is created on the log file, and one trigger is sent to the transaction processing system.

Chain messages represent a set of individual messages that are to be processed one at a time in a predetermined sequence. In all other respects, chain messages are the same as regular messages. Chain messages can be either finite chains or infinite chains. Infinite chains have no beginning or end message and may occur across time. Finite chains, on the other hand, have a distinct first and last message.

Bulk messages comprise a set of messages that are processed as an entity or batch. For each set of batch of messages, one control record exists, indicating the location and the number of data records involved. In managing the flow of messages through the interface system, the subsystems only process the control record. Once the bulk data messages are received, only the transaction processing system processes the dam records. Only one acknowledgment is sent for the set. For outbound bulk sets, only the outbound communication module processes the data records.

A monitor subsystem is provided to generate timing strobes or events necessary to initiate certain interface system processes. For example, the trigger process and the acknowledgment process are initiated by strobes generated by the monitor subsystem at regular timed intervals. The monitor subsystem also schedules the initiation of outbound processes. Outbound processes include sending acknowledgments and other outbound messages to the external processes.

Additionally, the present invention recognizes an external interface timer. The interface timer is capable of starting multiple processes of various applications. The interface timer provides an elapsed time capability.

A monitor tool is optionally provided to allow summary and detailed information to be displayed for each message as it is processed by the SAP system. The monitor tool provides a primary selection screen in which messages or groups of messages can be selected for monitoring. A summary list screen shows the results of the selection, and indicates message information such as message type, batch number, serial number, process name and process time. A detailed header screen is provided to display detailed information for an individual message.

Another advantage of the present invention is that it allows an operator or an external application to check the status of an input message as it is being processed through the transaction processing system.

A key feature of the present invention is that 'flat' data records are delivered to business applications running inside the transaction processing system. The business applications then use these codes to build its own screen buffers outside of the interface system and inside the transaction processing system where the definitions of the screens are available.

Still another advantage of the interface system is that a single point of control is provided for interfacing to the transaction processing system. All interfaces are standardized according to the interface system and the external applications only need to communicate with this standard interface. Troubleshooting of problems is greatly simplified by this aspect of the invention.

Further features and advantages of the interface system as well as the structure and operation of various embodiments of the interface system are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit(s) of a reference number identifies the drawing in which the reference number first appears.

FIG. 12 illustrates a detailed header screen for a specific control record.

FIG. 13 illustrates a control record PC screen.

FIG. 20 is a diagram illustrating a list screen according to the present invention.

FIG. 21 illustrates a primary selection screen.

DETAILED DESCRIPTION OF THE INVENTION

Table of Contents

Figure 1:
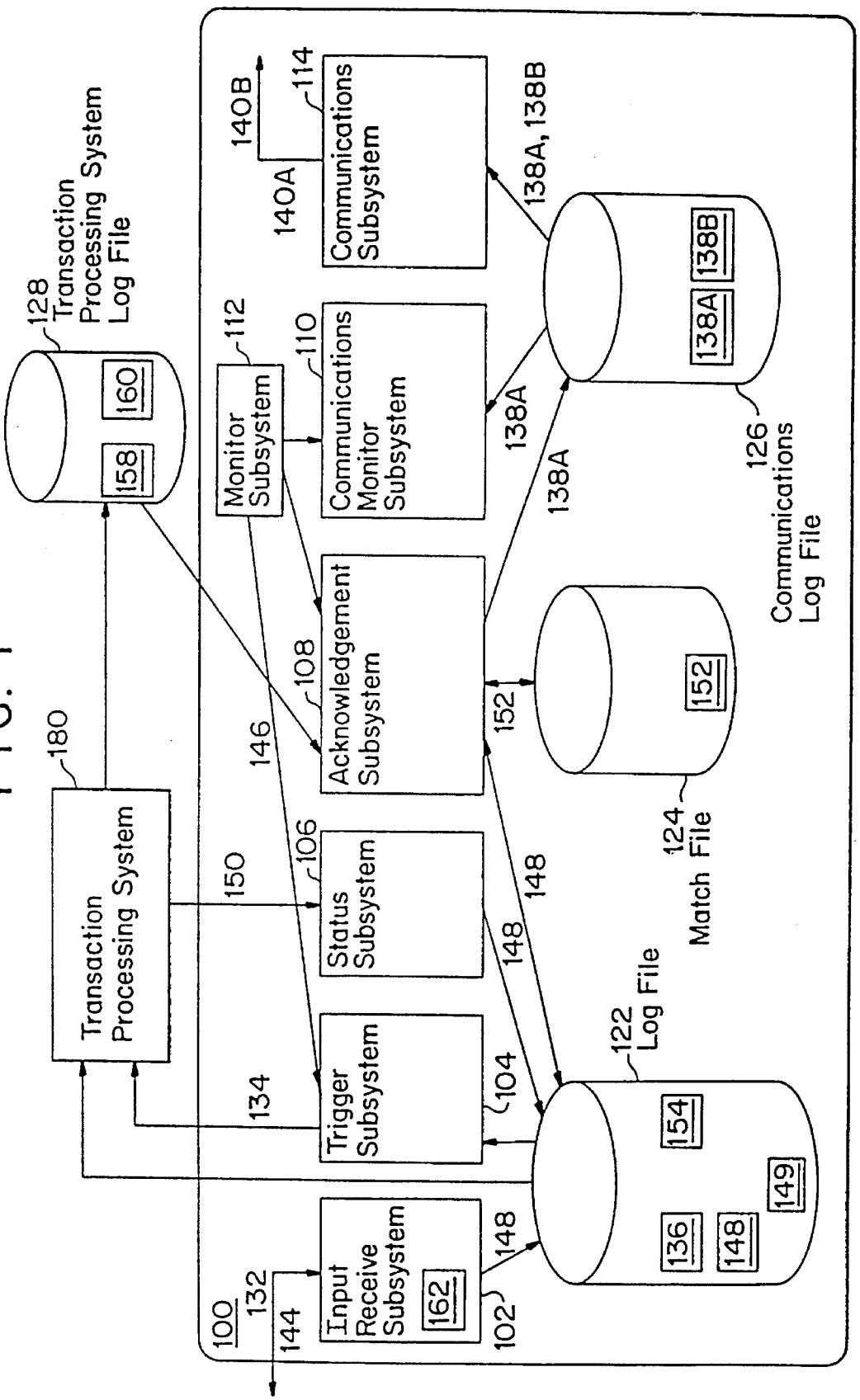
FIG. 1 is a block diagram illustrating the interface system according to the present invention.

1. Overview of the Invention
   1.1 Definitions
   1.2 Introduction
2. Environment of the Invention
3. Detailed Description of the Preferred Embodiment
   3.1 Classes of Message Service
   3.2 Functions
   3.3 Inbound Function Subsystems
      3.3.1 Input Receive Modules
      3.3.2 Trigger Process
      3.3.3 Status Process
      3.3.4 Acknowledgment Process
   3.4 Outbound Function Subsystem
      3.4.1 Communications Monitor Subsystem and Process
      3.4.2 Communications Subsystem and Process
4. Monitor Process
5. Startup Of Interface System
6. Shutdown 7. File Reorganization
8. Display Function
9. Conclusion

1. Overview of the Invention

The present invention is directed to a system and method for interfacing an external process or application to a transaction processing system.

The interface system of the invention provides guaranteed delivery and processing of messages received from external applications. Additionally, the interface system provides a confirmation to an external application when a message is received and an acknowledgment when the processing is complete. The interface system also provides message tracking and status monitoring.

In a preferred embodiment, the invention provides an interface to a SAP system as described above. Alternative embodiments provide an interface to other business applications or transaction processing systems.

1.1 Definitions

A "process" is a unit of work that can be done independently of other units of work.

A "transaction" is a process defined to the transaction processing system, by name, identifying one or more modules which will perform the process.

A "module" is a group or unit of compiled software instructions. A module may represent a process in its entirety or a sub-process.

A "task" is a specific occurrence or execution of a process or transaction. Multiple tasks of the same transaction may exist at the same instant in time.

A "monitor" task or process is one whose function is to oversee or 'monitor' the progress of other tasks, rather than to carry out processing of a data message.

A "record" is a unit of data stored on a computer system, usually in a file or database.

"Message" has two meanings depending on the context: First, messages are the transmission of a data record between two processes. Second, messages are also data transmissions between the interface system and other systems such as a transaction processing system or external applications.

An "event" is the occurrence of an activity, such as the transmission of a message. Events may be used to initiate the execution of a task.

A "Control Record" is a record on the interface system log file used to control the processing of a message from an external application through the system. A control record may contain the data to be interfaced, or may point to a set of data to be interfaced.

An "Active Control Record" is a control record which is in a status such that the interface system is currently working on it and its status is expected to change.

A "header" is a portion of a control record, usually at the beginning of the record, which contains information necessary to control processing of the message.

A "data record" is one of a set of related records that contains only a minimal header and are collectively represented by a separate control record.

"File type" is a two-letter code in the header of the record, indicating the type of control record that is represented by the data in the record. File type is used to localize certain types of records in one portion of the file. Examples of file types are provided in Table 1.

A "subsystem" is the hardware implemented to run a module or modules in order to perform a process. A subsystem can be a physical or a logical subset of the interface system.

TABLE 1

File types Used in Log File 122

| Description | Inbound | Outbound |
| --- | --- | --- |
| Active Control Records | PN, PO | PM |
| Control Records Finished Successfully | PR | PS |
| Control Records Finished in Error | PX | PY |
| Chain Control Records awaiting turn to process | PQ | not applicable |
| Master Control Record only one ever exists | PC | PC |
| Bulk Data Records | PZ | P0 |
| Internal Trace Records | P9 | P9 |

1.2 Introduction

FIG. 1 is a block diagram illustrating an interface system 100 according to the present invention.

According to the preferred embodiment, interface system 100 comprises seven subsystems and three data files. The seven subsystems include an input receive subsystem 102 which performs an input receive process, a trigger subsystem 104, a status subsystem 106, an acknowledgment subsystem 108, a communications monitor subsystem 110, a monitor subsystem 112, and a communications subsystem 114. The three data files of interface system 100 include an interface system log file 122 referred to as log file 122, a match file 124, and an outbound communications log file 126.

Log file 122 is used for storing control records 148. The purpose and function of control records 148 will be described below.

Match file 124 is essentially an index linking log file 122 with a transaction processing system log file 128.

A communications log file 126 is used for queuing outbound messages 140. Outbound messages 140 are queued in accordance with their destination. Outbound messages 140 are generated based on outbound control records 138 submitted by acknowledgment subsystem 108.

Input receive subsystem 102 is responsible for receiving input messages 132 from external applications and for logging receipt thereof onto log file 122. Trigger subsystem 104 performs a trigger process. The trigger process browses log file 122 searching for received messages. When a received message is found, trigger subsystem 104 informs a transaction processing system 180 that a message is present requiring action.

Status subsystem 106 receives information in the form of processing status messages 150 from transaction processing system 180 regarding the status of message processing. This information is then used to update log file 122.

Acknowledgment subsystem 108 performs an acknowledgment process which scans log file 122 and updates control records 148 based on information in match file 124 indicating whether processing of a message is complete. It also 'finishes' records when transaction processing is complete or an error has occurred and, if acknowledgment is indicated by the appropriate option flag, writes an outbound control record 138 to communications log file 126.

Communications monitor subsystem 110 performs a communications monitor process which monitors the records in communications log file 126. Communications monitor subsystem 110 manages multiple occurrences of the outbound communication process, insuring that only one task is started for each destination, and that the messages are communicated in the correct order.

Communications process subsystem 114 performs an outbound communications process which retrieves outgoing messages from communications log file 126, establishes a link to an external application, and sends these messages to the external application.

Figure 2:
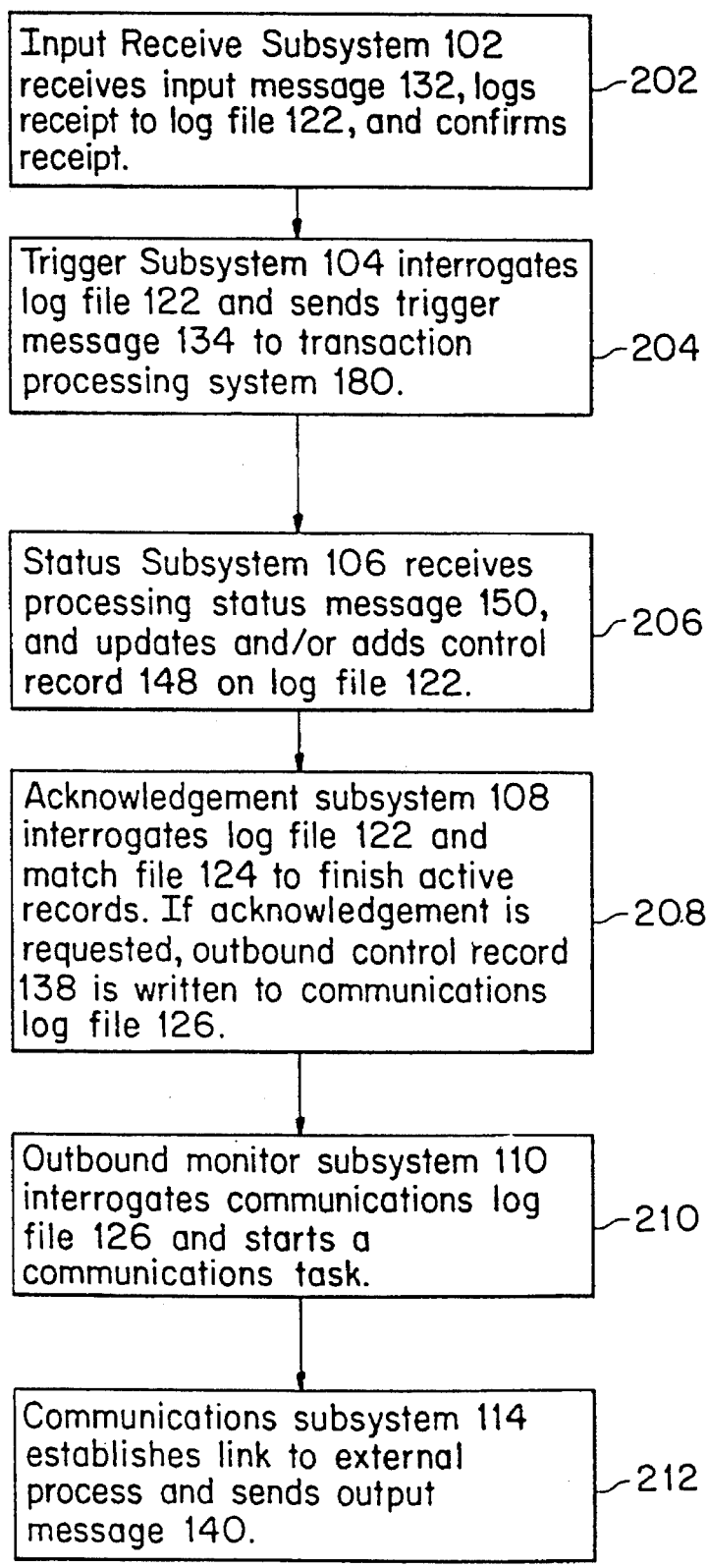
FIG. 2 is a flow chart illustrating the general operation of the interface system according to the present invention.

FIG. 2 is a flow chart illustrating the operation of interface system 100 according to the present invention. Referring to FIG. 1 and FIG. 2, operation of interface system 100 will be generally described.

In a step 202, input receive subsystem 102 receives an input message 132 from an external application. When input message 132 is received, input receive subsystem 102 logs message 132 onto log file 122. In logging message 132, a control record 148 is created for each input message 132. For all message types other than bulk (described below) control record 148 contains a header and the data from input message 132. For bulk input messages 132, control record 148 comprises a header which includes a flag indicating the existence of a bulk data set on log file 122. In a control record 148 for a bulk input message 132 a flag is set in the header, indicating the control record 148 represents bulk data.

Interface system 100 processes only control records 148. More specifically, only header information is processed by interface system 100. Interface system 100 performs all of its functions without processing the data received in input message 132. This data is simply routed among transaction processing system 180 and the external applications through the use of control records 148. As mentioned above, for a regular message, the data is contained within control record 148. For a bulk message, control record 148 comprises a pointer to the data.

Input receive subsystem 102 also provides a confirmation 144 back to the external application, confirming receipt and logging of input message 132.

Input receive subsystem 102 is configured to receive input messages 132 from external applications. Input messages 132 may include, for example, customer codes, inventory or production schedule updates, invoicing information, et cetera. According to a preferred embodiment, a plurality of input receive modules 162 within input receive subsystem 102 are employed to interface to multiple external applications using different communications techniques or protocols. Each module 162 processes messages in the same manner. However, each module 162 employs a different communications protocol for communicating to external applications.

Log file 122 contains a plurality of control records 148. Each control record 148 contains the full text of a received input message 132 (for certain types of messages) along with header information. Records stored in log file 122 are organized according to a file-type field (file types displayed in Table 1). Specifically, active control records 148 are stored together in one part of the log file 122, separate from control records 148 that are on chains and not yet ready to process and from control records 148 that are finished processing (finished control records 148). By this technique, processing efficiency is achieved. When processes browse only through the active control records 148, a minimum amount of input processing has to be performed because these processes do not have to browse through finished control records 148.

Active control records 148 are differentiated from finished control records 148 and chain message control records 148 through the use of the file types as illustrated in Table 1 above. Active control records 148 for an inbound message are of file type PO. For chain messages that are not yet ready for processing the file type is PQ. For control records 148 finished successfully or in error (e.g. timed out) the file type is either PR or PX, respectively.

These file types are illustrated as an example of the preferred embodiment. Alternative embodiments may be contemplated wherein other schemes are used to distinguish the various control records 148.

In a step 204, a trigger subsystem 104 interrogates log file 122 to determine whether an active control record 148 is available for processing. When an input message 132 is available and a threshold of message volume has not been exceeded, trigger subsystem 104 sends a trigger message 134 to transaction processing system 180 indicating that an input message 132 has been received from an external application and has been logged onto log file 122 in the form of a control record 148. Trigger message 134 contains data in the form of a key that tells transaction processing system 180 where to find control record 148 in log file 122. When transaction processing system 180 reads the control record 148 pointed to by the key, it knows where the data pertaining to the associated input message 132 resides on control record 148.

The key contains fields indicating a file type, a batch number, a serial number, and a data format name to designate the type of processing required. For input messages 132 that are part of a chain mail chain, the batch number in the key for each trigger message 134 associated with each input message 132 will be the same. When bulk input messages 132 are received, they are logged into log file 122 as a single control record 148 and one or more data records 149. For input messages 132 that are part of a bulk data set, the batch number in each data record 149 is the same as the batch number of the control record 148 for that bulk data set.

In a step 206, status subsystem 106 updates log file 122 based on information received from transaction processing system 180. Status subsystem 106 receives a processing status message 150 from transaction processing system 180. Processing status message 150 can be one of three types of message. First, it can contain an entirely new control record which causes a new control record 148 to be created on log file 122. Second, processing status message 150 can contain an update to a control record, causing status subsystem 106 to modify an existing control record 148 to reflect the current processing status. Third, processing status message 150 can contain an update to a master control record 154. Master control record 154 is a control record in log file 122 that contains housekeeping information pertinent to interface system 100. Information contained in master control record 154 includes information such as the last serial number assigned, the last batch number assigned, and a limit to the number of messages that can be submitted to transaction processing system 180.

In a step 208, an acknowledgment process is performed by acknowledgment subsystem 108 wherein the status of control record 148 is set. Acknowledgment subsystem 108 queries match file 124 to determine the status of transaction processing system 180 in processing input messages 132. Transaction processing log file 128 of transaction processing system 180 is not indexed. Therefore, to allow acknowledgment module 108 to locate a control record 148 (corresponding to a particular input message 132) on transaction processing system log file 128, an external index to transaction processing log file 128 is provided. This external index is stored on match file 124.

Acknowledgment subsystem 108 reads an active control record 148 on log file 122 to determine whether processing of that control record 148 is complete, an error occurred, or a time-out has occurred and input message 132 should be re-sent. If the external application requested that an acknowledgment status message be sent or a control record 148 indicates an outbound data message is to be sent, acknowledgment subsystem 108 stores an outbound control record 138, which is a copy of control record 148, in communications log file 126. The external application requests acknowledgment by setting an option flag in the header of input message 132. Outbound control record 138 can be an outbound status record 138A or an outbound data record 138B. Outbound status record 138A is an acknowledgement of inbound control record 148. Outbound data record 138B contains outbound data for regular messages or a pointer to data on outbound log file 804 (FIG. 8) for bulk data sets.

In a step 210, communications monitor subsystem 110, which is started by monitor subsystem 112, browses communications log file 126. When an outbound control record 138 is found, a check is made to see if a communications task is already connected to the destination designated by that outbound control record 138. If not, and if there are not already more than a threshold number of communications tasks started, one will be started for the specific destination.

In a step 212, communications subsystem 114 sends a resultant outbound message 140 to a location defined as the destination. Depending on the action specified by input message 132, outbound message 140 may be returned to the original application that sent input message 134, or outbound message 140 may be sent to an alternative recipient destination such as another process or application.

In a preferred embodiment of the invention, interface system 100 operates asynchronously. That is, subsystems 102, 104, 106, 108, 110 and 114 perform their processes temporally independent of the other modules. Only when action is required of a module will that action be performed. Action is required when an event occurs. An event may be the arrival of an input message 132, for example.

Monitor subsystem 112 is provided for processes that must be started by a timing strobe. Some processes do not have initiating events such as the arrival of input messages 132. Monitor subsystem 112 provides an artificial event by forcing a start of these processes so that these processes may check to see if work needs to be performed. Every N seconds, monitor subsystem 112 prompts trigger subsystem 104 to interrogate log file 122, prompts acknowledgment subsystem 108 to do a status check, and prompts communications monitor subsystem 110 to check whether there are messages to be sent. In the preferred embodiment, N is set to a value low enough to ensure that work is completed in a timely fashion, but not so low as to cause unnecessary overhead by checking too frequently whether work needs to be done.

2. Environment of the Invention

Figure 3:
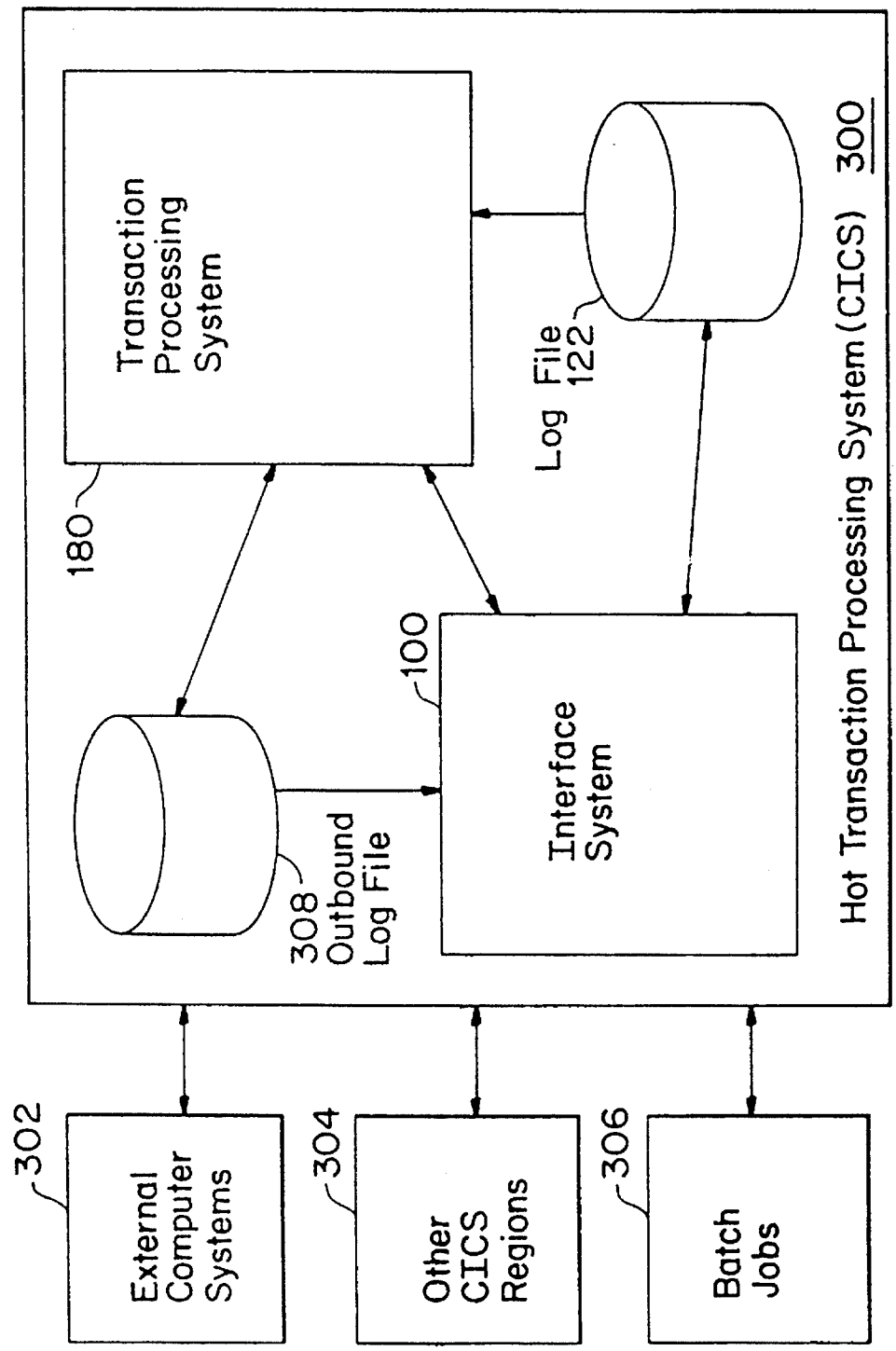
FIG. 3 is a block diagram illustrating the interface system in an example environment.

FIG. 3 is a block diagram illustrating the preferred environment in which the present invention operates.

Interface system 100 is a distinct entity existing in a CICS region 300. Transaction processing system 180 also runs in CICS region 300. In the preferred environment, transaction processing system 180 is the SAP R/2 system. External applications 302, 304, 306, which exist outside of CICS region 300, communicate with transaction processing system 180 through interface system 100. Typically, external applications 302, 304, and 306 exist in a remote machine, often at a remote facility.

Three types of external applications are illustrated in FIG. 3. For example, external application 302 may be run on any computer capable of communicating via an LU6.2 Protocol, such as a Digital Equipment Corp. VAX Model 6000 computer, or an IBM mainframe computer such as an IBM model 3090-600, or other mainframe computer, other CICS regions, or batch jobs running on the same machine as CICS region 300.

Alternative embodiments of the present invention can be considered in which transaction processing system 180 runs in an environment other than the CICS environment. In this case, protocols other than LU6.2 protocol may be used for interfacing external processes to transaction processing system 180. Thus, external processes are not limited to LU6.2 protocols, and interface system 100 may be capable of communicating in protocols other than LU6.2 in these alternative embodiments.

As discussed above, input receive subsystem 102 includes one or more input receive modules 162. A different input receive module 162 is required for each type of communication protocol. Each input receive module 162 uses a different communications format suitable for interfacing with a different type of external application. Thus, a preferred embodiment of the present invention has three input receive modules 162.

There are separate input receive modules running in input receive subsystem 102 for each of the different communications protocols used by the external applications, but their functions are basically the same. Except for these input receive modules, all processing is the same, inside the interface system, for all three types of external applications.

3. Detailed Description of the Preferred Embodiment

Referring again to FIG. 1, as described above in Subsection 1, interface system 100 receives messages 132 from external applications, confirms receipt, acts on each message 132, and sends a resultant outbound message 140 where required.

3.1 Classes of Message Service

There are three classes of message service provided by interface system 100. These are regular messages, chain messages and bulk messages. Each of these will be generally described.

Regular messages represent the basic service of interface system 100. The other classes are variations of this class. For regular messages, each message is an independent entity, complete by itself. Regular messages are delivered independently of any other message. For each input message 132, one control record 148 is created on log file 122 and one trigger message 134 is sent to transaction processing system 180. An application program running within transaction processing system 180 (such as a business application within SAP) is expected to process that one control record 148. If an acknowledgment is requested, one acknowledgment message is created by acknowledgment subsystem 108 and sent to the external process by communications subsystem 114.

Only one record is put on log file 122 for each regular input message 132. This is called a control record 148. For each regular input message 132, a control record 148 contains a header field and the data from input message 132.

Chain messages represent a set of regular messages that are to be processed one at a time, in a predetermined sequence. The sequence is defined by the external application. Chain messages are processed exactly like regular messages, except that the messages are only processed in sequence. A chain message is not submitted for processing until all previous messages in the chain have been finished.

There are two kinds of chains. These are infinite chains and finite chains. Infinite chains have no beginning or end. They exist across time, and input messages of an infinite chain may arrive at any time. No link is identifiable as a first link or a last link.

Finite chains (FML chains), on the other hand have a distinct first and last link. Each chain has its own beginning or first link ("F") and ending and last link ("L "). In between the F and L links are any number of middle ("M") links. If a finite chain has only one link, it is by definition an L. Processing of a finite chain does not commence until all the links have been received. Acknowledgment of a finite chain does not occur until the last link is processed.

An example of the utility of chain messages will now be provided. When a regional sales office accepts a new customer, certain information in the form of a 'customer master' has to be entered into the main office databases before an order can be placed for acceptance and processing. For example, customer information such as billing and shipping addresses and a credit limit must be present before an order will be accepted. If the regional sales office sends messages with this information, the messages should be sent in a specified sequence so that the order can be processed without error. For a customer master to be added to the database, the country, state and city codes must already exist in the database. If they do not exist, then they must be sent in a specific sequence and must be processed in that sequence. This sequence of information is presented in a chain message format.

Bulk messages represent a set of messages that are processed as an entity or in a batch. For each set of messages, one control record exists. The control record indicates which application in transaction processing system 180 will process the entire set and the number of data records involved. One trigger 134 is sent to transaction processing system 180, and one invocation of the application in transaction processing system 180 is used to process all the records in the set. Only one acknowledgment is sent to the external application for the entire set. This acknowledgment simply contains a count of the messages processed correctly and the number of messages in error.

In sending bulk messages, the external application sends one or more sets of data in a transmission or file. Each set contains a header, some number of data records, and a trailer record. The trailer record is converted into control record 148 on log file 122.

3.2 Functions

Interface system 100 according to the present invention, can be described in terms of performing two general functions. These are an inbound function for receiving and processing inbound messages from external applications, and an outbound function for creating outbound status and outbound data messages and sending them to the external applications. These functions are discussed below in conjunction with the discussion of the seven subsystems 102, 104, 106, 108, 110, 112, 114 of interface system 100 and the processes they perform.

3.3 Inbound Function Subsystems

The inbound function is shared among several subsystems. These include input receive subsystem 102, trigger subsystem 104, status subsystem 106, acknowledgment subsystem 108, and monitor subsystem 112. The inbound function for each input message 132 ends by writing or updating an interface system status code and changing the file type of control record 148 on log file 122 to indicate that control record 148 is finished.

Control record 148 includes an interface system status code. The value of the interface system status code indicates which subsystem last processed the message. Thus, the interface system status code has a unique value indicating which subsystems have completed their processing of input message 132. Each subsystem will only process a record whose interface system status code indicates that it has been previously processed by the prerequisite subsystem(s).

Using this interface system status code to indicate completion and readiness for processing by the next subsystem allows interface system 100 to process messages asynchronously.

In a preferred embodiment, the interface system status code is designated using a numerical value from 1 to 9. Also included is a status of "C" to indicate that the control record 148 is complete.

Only active control records 148 are processed; those of file type PO and outbound PM (file types illustrated in table 1 ). As mentioned above, inactive or finished control records are not processed. Additionally, data records are not processed, but inbound data records are received (e.g. input message 132 and outbound data records are sent (e.g. output message).

Some modules convert other control record 148 types to these types. For example, chain message processing changes PQ type messages to PO type messages.

A PQ record represents a chain message that is not yet available for processing either because the preceding record has not finished processing, or because the last record has not yet been received. When it becomes available, it is converted to a type PO record. Once processing of an active control record 148 has finished, it is converted to a 'finished' control record 148 (type PX or PR) and thus is removed from the pool of active control records 148.

Referring again to FIG. 1, the function of each subsystem 102, 104, 106, 108, 112 that performs an inbound function will now be described. The process of input receive subsystem 102 receives an input message 132 from the external application and logs a control record 148 corresponding to that message to interface system log file 122. Input receive subsystem 102 generates a single control record 148 for each regular or chain input message 132 or set of bulk input messages 132. Input receive subsystem 102 then sends a confirmation message 144 to the external application that input message 132 has been received and logged. Alternatively, input receive subsystem 102 causes a flag to be set in a communications control block of the communications protocol which causes the communications protocol to set a confirmation flag.

Following processing by input receive subsystem 102, the interface system status code for the input message is set to "1" in control record 148. A status of "1" indicates that input receive subsystem 102 has completed its processing of input message 132.

Input receive subsystem 102 is event driven. In other words, input receive subsystem 102 only performs its processing when it receives an input message 132 (i.e. when an event occurs) from an external source.

The trigger process of trigger subsystem 104 browses the active control records 148 in log file 122 and sends a trigger message 134 to transaction processing system 180 for each active control record 148 that is ready to be processed. The trigger process then updates the interface system status code for the active control record 148 to "3", indicating that trigger subsystem 104 has completed its process.

Trigger messages 134 are sent to a transient data (TD) queue mechanism in CICS. In transaction processing system 180, this queue facility is called ODC for Online Data Communications. When transaction processing system 180 receives data in the ODC transient data (TD) queue, it automatically executes the transaction specified by the data.

The trigger process also monitors the number of outstanding triggers. A trigger is considered outstanding from the time it is submitted to the ODC transient data queue until the associated input message 132 is processed by transaction processing system 180, processing status message 150 is generated by transaction processing system 180 and is passed to status subsystem 106, and the active control record has been Updated to a status of "4".

When the number of trigger messages 134 exceeds a pre-selected trigger threshold (i.e., the ODC queue is full to a pre-selected level), trigger process 104 does not submit any additional trigger messages 134 to transaction processing system 180. This prevents overloading the queue and adversely affecting the performance of other ODC queue users.

The operation of the trigger process in trigger subsystem 104 is initiated by monitor subsystem 112 as described above in section 1.2 of this document. In addition, the trigger process can be initiated by acknowledgment subsystem 108 when it finishes a chain message and converts the next link in the chain to active.

Status subsystem 106 receives processing status messages 150 from transaction processing system 180 and updates log file 122. The interface system status code of status subsystem 106 is "4", indicating that status subsystem 106 has completed its processing. Status subsystem 106 is event driven. Status subsystem 106 performs its process only when transaction processing system 180 requests status processing pursuant to an input message 132. Processing status message 150 may indicate that a preliminary processing phase in transaction processing system 180 has completed successfully and that further processing by transaction processing system 180 is expected to occur. Alternatively, the status update may indicate that an error was encountered and further processing will not occur, or that processing of input message 132 is complete and no further processing will occur.

The process performed by acknowledgment subsystem 108 is to check a processing status of input messages in transaction processing system 180, and when appropriate, to "finish" the active control record 148, and to initiate the sending of an outbound control record 138. In the case of chain messages, acknowledgment subsystem 108 converts the next chain message in the chain to active outbound control record 138 is sent to communications log file 126. The interface system status code is updated to "8" or "9" when the acknowledgment process is finished. A status of "8" indicates successful completion (i.e. file type PR) while a status of "9" indicates completion in error (i.e. file type PX).

The acknowledgment process is initiated by monitor subsystem 112 or by status subsystem 106. If, for example, status subsystem 106 knows that it is going to update control record 148 from a type PQ to a type PO, it may start the acknowledgment process rather than waiting for the monitor process to start it.

As discussed above, input receive subsystem 102 uses several input receive modules 162 to perform the inbound process. Each of the inbound process modules that operate in input receive subsystem 102 will now be described in more detail.

3.3.1 Input Receive Modules

In the preferred embodiments, there are actually three input receive modules that perform the input receive processing of input receive subsystem 102. Alternative embodiments may contain a different number of input receive modules as required to interface to the external applications.

The three input receive modules 162 are configured to handle an LU6.1 protocol, an LU6.2 protocol, and an LU2 protocol for batch receiving input from batch jobs. The LU2 module exists through the use of a commercially available utility known as SYSB. SYSB is available from H&W Computing of Boise, Id.

Figure 4:
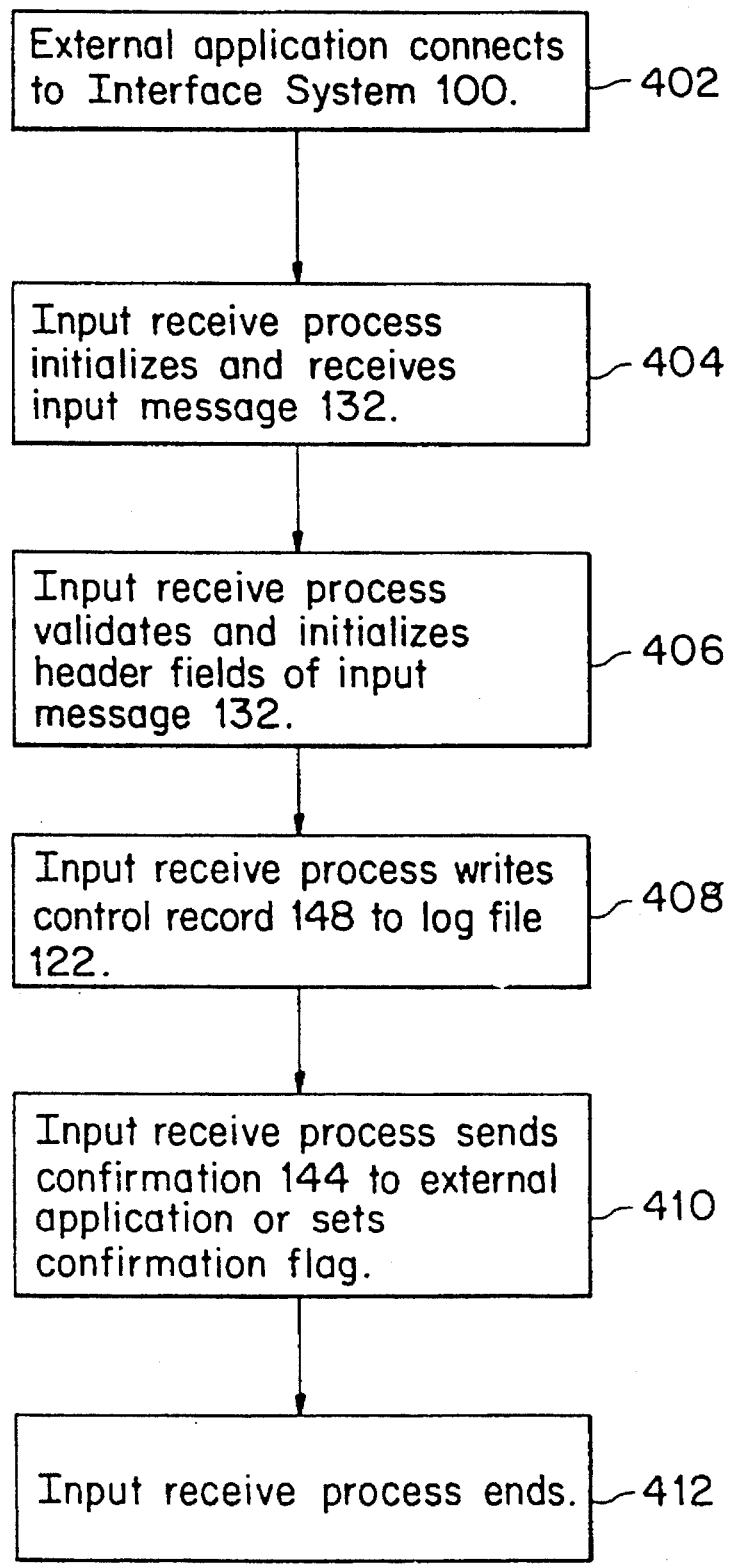
FIG. 4 is a flow chart illustrating the operation of an input receive process performed by an input receive subsystem.

FIG. 4 is a flow chart illustrating the steps taken by an input receive module in performing the input receive process. Referring to FIG. 4 and FIG. 1, the input receive process will now be described. In a step 402, an external application connects to interface system 100. In a step 404, once the external application is connected to interface system 100, the appropriate input receive module performs an initialization, and then receives an input message 132 from the external application. Multiple input messages 132 may be received in this step.

In a step 406, when an input message 132 is received, the input receive process validates some of the header fields of input message 132 and initializes other header fields. For example, the input receive process will look at the header to determine the length of the record. Additionally, if the header contains a "PO0000" batch number, a batch number is generated and assigned. Also, if a bulk message is received, the input receive process does not accept a second header of another bulk message until a trailer message for the first bulk set is received.

In a step 408, input message 132 is logged to log file 122 as control record 148. Input message 132, received by input receive subsystem 102, can be a chain message, a bulk message or a regular message. The specific process for writing control record 148 to log file 122 is dependent upon the type of input message 132 received.

If input message 132 is a batch message, and the batch number is "PO0000", input receive subsystem 102 finds the last automatically assigned batch number in the master control record 154 or on interface system log file 122. The number is incremented, used, and rewritten to the file.

Control record 148 is stored on log file 122 with a key comprising a file type, a batch number, a serial number, and a format name. The file types are described above in Table 1. The batch numbers are under the control of the external application, but the application may request that interface system 100 assign a unique batch number. The batch number starts with two characters unique to interface system 100, so that interface system 100 can recognize messages it created, among all other messages. The external application system makes such a request by designating a batch number of "PO0000." Interface system 100 responds by replacing the four zeros with four numeric digits such that the batch number is unique.

Batch numbers may be used by the external application to group related messages and to separate unrelated messages. For bulk messages and chain messages, all the elements of the bulk set or chain must have the same batch number, and no other messages may use this number. The serial number is always assigned by interface system 100, is used to force the key to be unique on the file, and is used to define the sequence of receipt of messages. The format name is an application-specified name that defines the format of the data message and is used to determine how transaction processing system 180 should process the input message 132.

When the input message 132 is a chain message and the chain is infinite, if a type "PO" control record for the batch already exists, the record is stored as type "PQ" to place it on the chain of waiting messages. If no "PO" record exists, it is stored as type "PO" (see Table 1).

When input message 132 is a chain message and the chain is finite (or 'FML'), the record is always stored as a type "PQ" initially. Input receive subsystem 102 will change the F (first) record to type "PO" only when the L (last) record has been received and exists in log file 122.

When a bulk message set is received by input receive subsystem 102, the set always includes a first record of type 'PH'. Thus, when message 132 is a bulk message, and the file type is PH, this indicates a new set is started. The bulk message set also includes one or more data records of either type PD or PE, and a final or trailer record of type 'PT'. More than one set may be received in one execution of the input receive process.

The first record (type PH) contains a skeleton header. After it is validated, it is used in subsequent data records. If a previous set did not have a trailer record, it is declared an error (this is discussed in greater detail below).

When input message 132 is a bulk message, and the file type is PD indicating it is a data record, an abbreviated header contained in input message 132 is merged with a header from the previously received PH message, and a control record 148 with a full header is written to log file 122 as type PZ. When input message 132 is a bulk message and the file type is PE, also indicating it is a data record, the full header is contained in the message. After validation it is written to the log file as type PZ as is.

When message 132 is bulk, and the file type is PT indicating that the set of bulk messages is complete, the total of the input messages 132 received in the bulk set is compared with the total in the trailer record. If the totals do not match, an error is declared. If the totals agree, a type PO control record is created.

When message 132 is a regular message, it is simply posted to log file 122 after the header is validated.

In a step 410, a confirmation message 144 is sent to the external application. The type of confirmation message 144 sent depends on the type of external application that sent input message 132 to input receive subsystem 102. Confirmation message 144 is issued when the sending application requests it, either by means of a request for confirmation or by indicating that it is ready to receive. In the case of batch input messages, no explicit confirmation 144 is sent. Alternatively, a flag is set in a communications control block of the communications protocol which causes the communication protocol to set a confirmation flag.

If during the course of input receive processing an error is declared and the message class is bulk or chain, then the value of a flag, called $ABORT_{13}$ FLAG, in the file header is tested. If ABORT_FLAG is TRUE, the entire set/chain is aborted. If it is FALSE, the set/chain is allowed to process. The default for chain messages, if ABORT_FLAG is not specified, is FALSE. The default for bulk is TRUE.

In a step 412, the receive process ends when the external application issues a request to free the communication link.

3.3.2 Trigger Process

Figure 5:
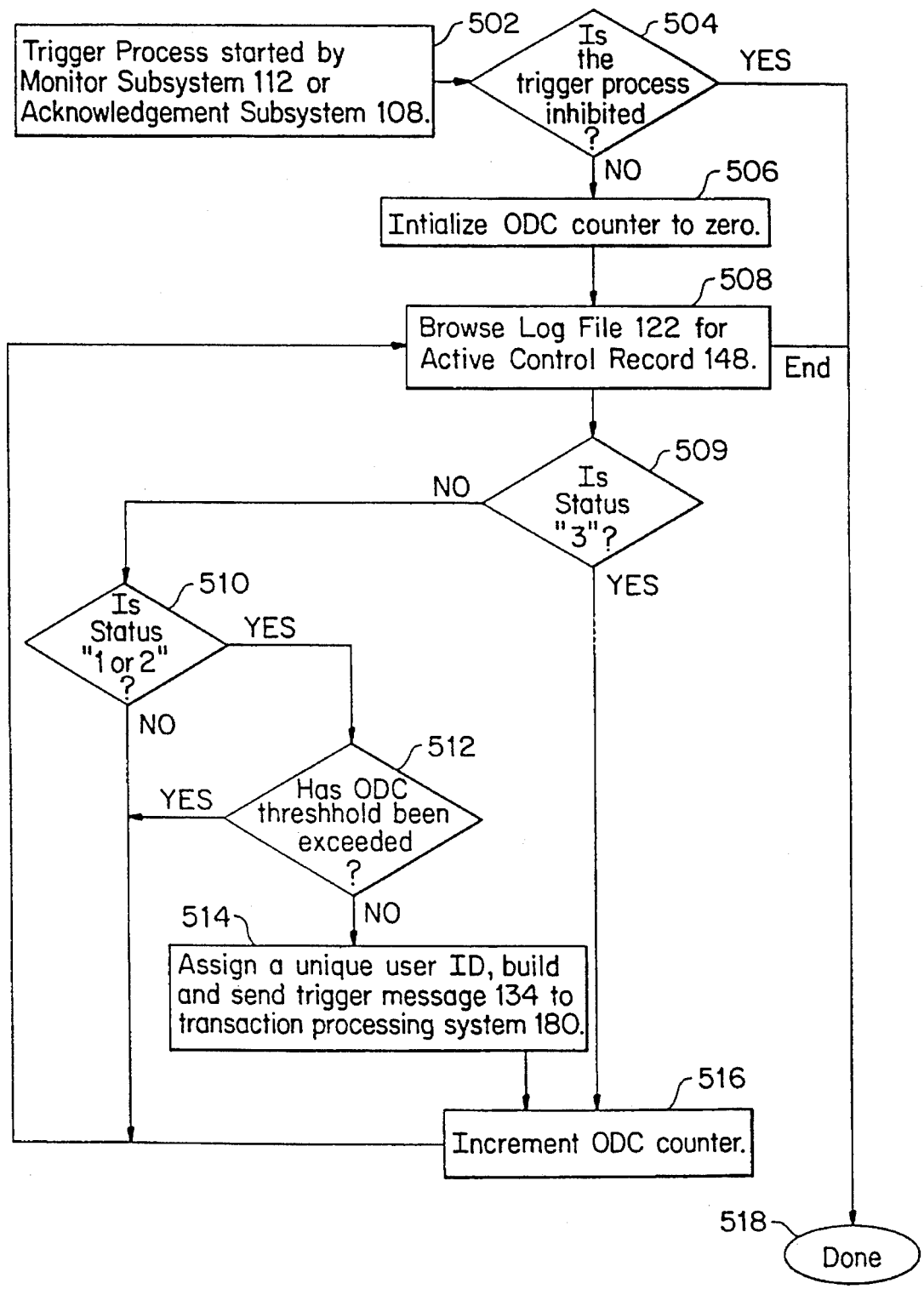
FIG. 5 is a flow chart illustrating a trigger process as performed by a trigger subsystem.

As mentioned above, trigger subsystem 104 is responsible for informing transaction processing system 100 of the availability of an input message 132 for processing. In the trigger process, interface system 100 does not actually deliver input message 132, but sends trigger message 134 to transaction processing system 180 to invoke a specific application which retrieves and then processes the record representing input message 132. Trigger message 134 includes data indicating the location of the record representing the input message 132. FIG. 5 is a flow chart illustrating the steps performed by the trigger process. Referring to FIGS. 5 and 1, the trigger process will now be described.

In a step 502, the trigger process begins. The trigger process is invoked by a time strobe event 146 generated by monitor subsystem 112. When monitor subsystem 112 outputs time strobe event 146 to trigger subsystem 104, the trigger process begins.

In addition to being invoked by monitor subsystem 112, the trigger process can also be invoked by acknowledgment subsystem 108. This occurs, for example, when acknowledgment subsystem 108 has released a new chain element. Additionally, the trigger process is invoked from batch to block or unblock the submission of ODCs.

In a step 504, a block flag is checked to determine whether the trigger process is inhibited. If blocked, then the trigger process terminates at step 518. If, however, the trigger process is not blocked, the trigger process continues with a step 506.

In step 506, when the trigger process is invoked by either monitor subsystem 112 or acknowledgment subsystem 108, the outstanding ODC counter is set to zero.

In a step 508, the trigger process browses log file 122 for active control records 148. Whether a control record 148 is active is determined by checking the file type of the control record 148.

At step 509, the status is checked to see if it equals "3." If it does, then the ODC counter is incremented at a step 516. A status of "3" indicates a control record 148 for which a trigger message 134 has been written to the queue but not yet processed. When transaction processing system 180 has processed the control record 148, the status is changed to "4." If the status is "4" or greater (steps 509, 510), the trigger process continues browsing at step 508.

However, if the control record 148 is found, at step 510, to have a status less than 3, the ODC counter is checked in a step 512 to see if it exceeds the predefined threshold. The threshold is set such that it will prevent an overflow in the ODC data queue. Such an overflow can occur because it is possible for interface system 100 to generate trigger messages faster than transaction processing system 180 can process them. Since the ODC TD queue is also used by other external applications, some of which may involve a user at a terminal waiting for a response, it is necessary to prevent interface system 100 from overloading the queue. As described above, this is accomplished by establishing a trigger threshold and by not exceeding that threshold. An outstanding ODC counter is initialized for each execution of the trigger process and is incremented each time a trigger message 134 is sent and each time a control record 148 is encountered for which a trigger message 134 has previously been sent but for which no processing status message 150 has been received.

If the count exceeds this predefined threshold, nothing is done and the process returns to step 508 to continue browsing. If the count does not exceed the predefined threshold, a trigger message 134 is built at a step 514 and written to the ODC TD queue. Trigger message 134 tells transaction processing system 180 that a message needs to be processed. Trigger message 134 also includes a key to identify the location control record 148 in log file 122. A unique user ID is created for each message in step 514. The user ID is made up from the batch number concatenated with the lower order six digits of the serial number. The resultant user ID is stored in the control record 148 header and is assigned to the ODC transaction submitted to the ODC TD queue. Note: batch numbers start with the letters PO, which will cause the user ID to start with these letters so that each batch number will be unique to the interface system 100. This is necessary in the acknowledgment process described below with reference to FIG. 7.

In a step 516, the ODC counter is incremented and the trigger process returns to step 508 where the browsing of log file 122 continues.

In step 508 when no more control records 148 exist in log file 122, the trigger task terminates. The trigger task will begin again at step 502 when invoked by monitor subsystem 112 or acknowledgment subsystem 108.

3.3.3 Status Process

Status subsystem 106 performs a status process. Interface system 100 is implemented such that only interface system 100 can update log file 122. Therefore, status updates from transaction processing system 180 must be passed back to interface system 100 for processing. This function is performed by status subsystem 106. Status subsystem 106 is also used to add or update control records 148 on log file 122.

Figure 6:
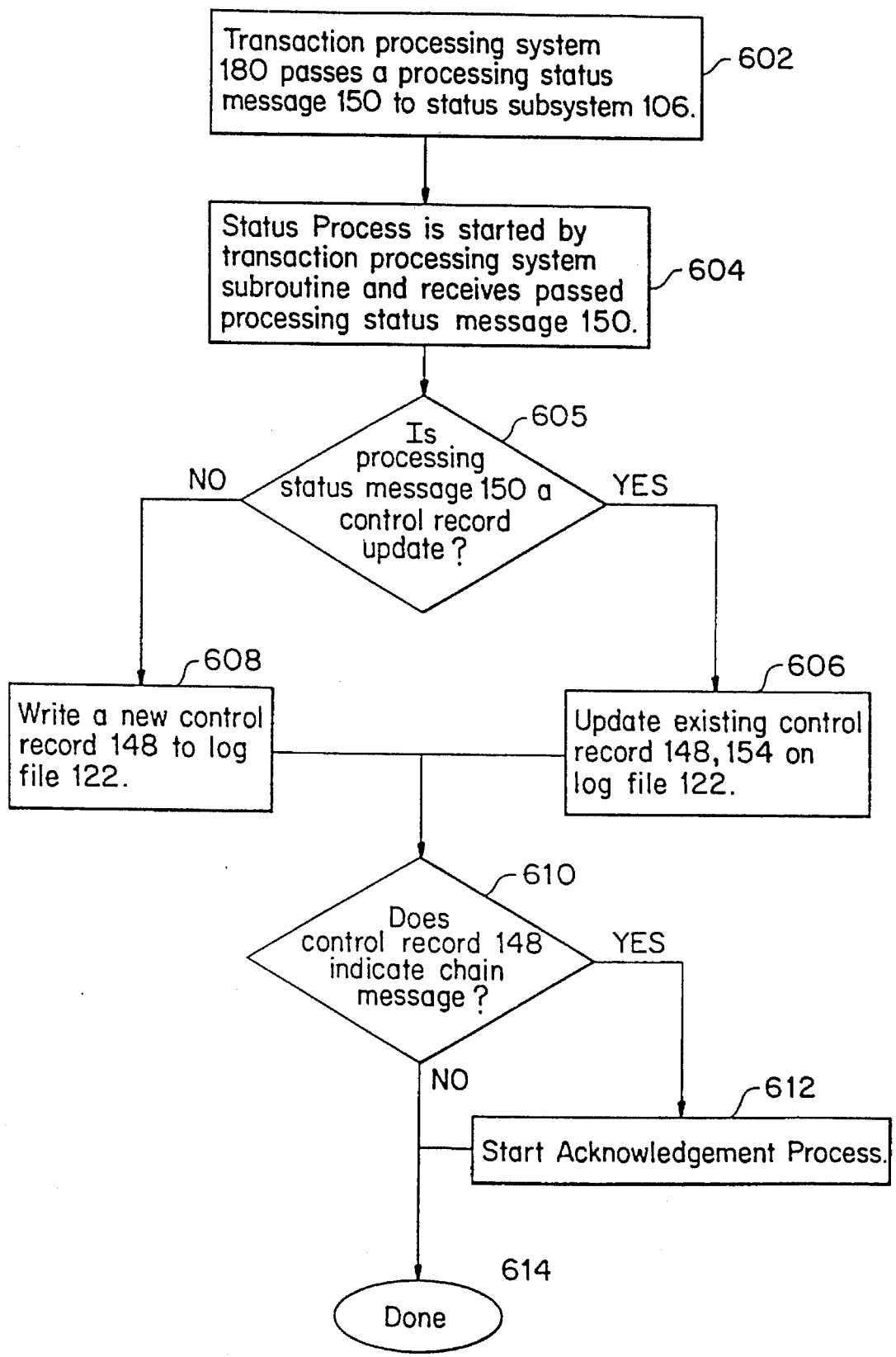
FIG. 6 is a flow chart illustrating a status process performed by a status subsystem.

FIG. 6 is a flow chart illustrating the method of the status process. Referring to FIGS. 1 and 6, the status process will now be described.

In a step 602, when an application running in transaction processing system 180 needs to communicate with interface system 100, it calls a provided subroutine. This subroutine passes a processing status message 150 containing either a new control record 148 to be added to log file 122 or an update to an existing control record 148. Additionally, an update to interface system 100 master control information in master control record 154 can be sent.

In a step 604, the status process is started by the subroutine and status subsystem 106 retrieves processing status message 150 from transaction processing system 180. This is a deliberate asynchronous break so that interface system 100 does not delay the online tasks. When the status process is invoked, the process first determines in a step 605 if processing status message 150 contains an update to a control record 148, 154 or a new control record 148. If processing status message 150 contains an update to a control record 148, 154, the status process continues at a step 606. In step 606, the relevant control record 148, 154 to be updated is read, updated, and rewritten. However, if the data is a new control record 148, the header data is validated, and the new control record 148 is written to log file 122 in a step 608.

In a step 610, if control record 148 indicates the message is part of a chain (i.e. a CHAIN_FLAG flag is set), the status process issues a start command for acknowledgment subsystem 108 at step 612. This allows acknowledgment subsystem 108 to begin its process without waiting for an event from monitor subsystem 112. Thus, acknowledgement subsystem 108 can start processing the next element in the chain without waiting for a signal from monitor subsystem 112.

If, in step 610, the value of the interface system status code indicates that transaction processing system 180 has completed processing the transaction, the status process is completed at step 614.

3.3.4 Acknowledgment Process

The acknowledgment process performed by acknowledgment subsystem 108 is a process of obtaining information regarding the status of a message in transaction processing system 180, and reporting this status to an external application. This status information is obtained by reading information in match file 124 or by reading control record 148 in log file 122. When the status represents a transaction that transaction processing system 180 has completed, acknowledgment subsystem 108 'finishes' control record 148 and if requested, reports this status to the external application that sent the original associated input message 132. In finishing a record, control record 148 is moved to a separate portion of log file 122 by adding a new control record 148 with a file type and an interface system status code indicating that it is finished, and deleting the old control record 148. Then acknowledgment subsystem 108 determines if the input message 132 requested an acknowledgment (i.e., if a flag was set). If so, an outbound control record 138 is sent to communications log file 126.

Figure 7A:
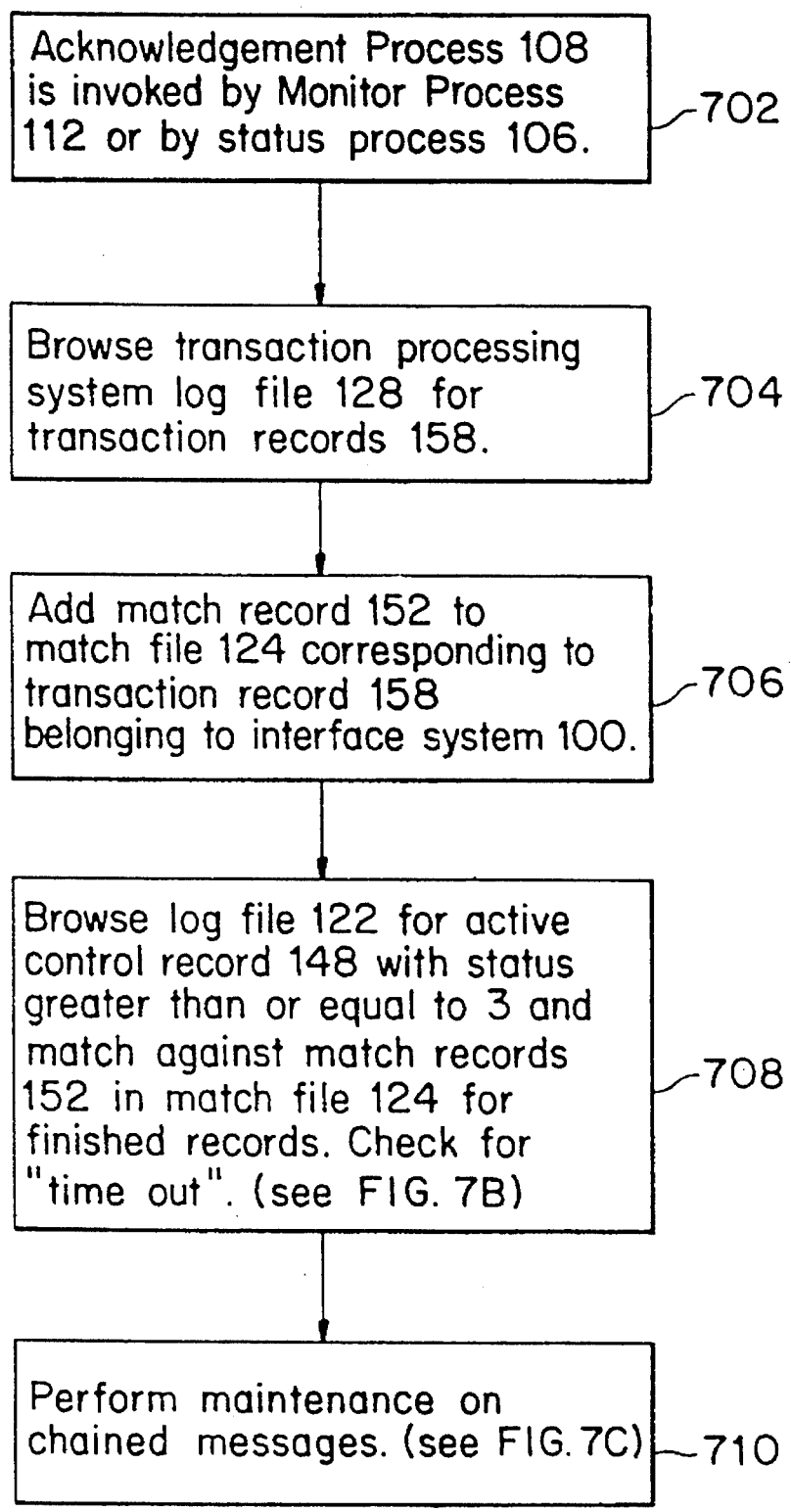
FIG. 7A is a flow chart illustrating an acknowledgment process as performed by an acknowledgment subsystem.
Figure 7B:
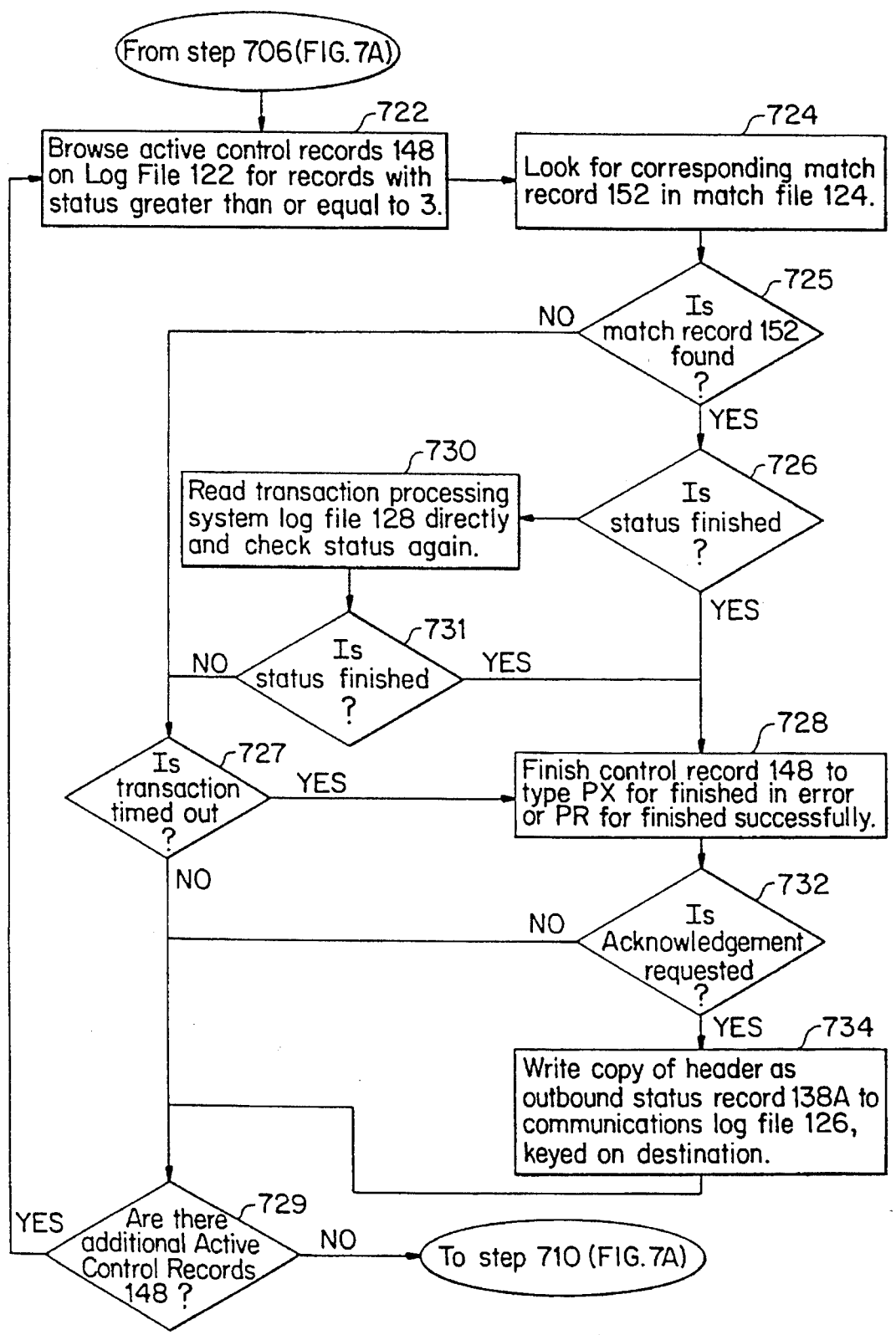
FIG. 7B is a flowchart illustrating the steps involved in carrying out step 708 of FIG. 7A.

FIG. 7A is a flow chart illustrating the overall acknowledgment process and FIG. 7B illustrates a portion of FIG. 7A in more detail. Referring to FIGS. 1, 7A and 7B, the acknowledgment process will now be described. In a step 702, acknowledgment subsystem 108 is invoked by monitor subsystem 112, or by status process 106.

In a step 704, acknowledgment subsystem 108 browses the transaction processing system log file 128 looking for transaction records 158. Transaction processing system 180 transactions generate transaction records 158. Transaction records 158 may be generated in response to a trigger message 134 sent by interface system 100. A trigger message 134 may result in many transactions in transaction processing system 180 that generate transaction records 158, or may result in no transactions that generate a transaction record 158. Each transaction record 158 generated as a result of a transaction triggered by trigger message 134 will contain a user ID starting with PO.

The transaction processing system log file 128 can be extremely large, and is not organized for direct processing. Processing the file sequentially in its entirety at each execution would take too much time. Thus, the acknowledgment process browses only those transaction records 158 that have been added to transaction processing system log file 128 since the last execution of the acknowledgment process. Acknowledgment subsystem 108 looks for a transaction record 158 representing an interface system 100 transaction. Transaction record 158 contains a user ID starting with two characters unique to interface system 100 as assigned in step 514 discussed above.

In a step 706, when transaction record 158 having a user name starting with the letters PO is found, a match record 152 is added to match file 124.

Match record 152 created in step 706 contains data elements plus the relative byte address (RBA) of transaction record 158 on the transaction processing system log file 128. This process continues until the end of file is found. The highest RBA read is stored in master control record 154 on log file 122.

If an error is encountered reading log file 122, the highest RBA file is set to zero, the records on match file 124 are deleted, and the process is started over. Thus, match file 124 is rebuilt from scratch.

In a step 708, acknowledgment subsystem 108 browses control records 148 on log file 122 searching for records with a status greater than or equal to 3. Each control record 148 found is matched against match records 152 in match file 124 to determine if the transaction is finished or if the transaction has timed out. Step 708 is discussed in greater detail below with reference to FIG. 7B.

In a step 710, acknowledgment subsystem 108 performs maintenance on chained messages. This maintenance is discussed in greater detail with reference to FIG. 7C.

Step 708, described above, will now be described in greater detail with reference to FIG. 7B.

In a step 722, active control records 148 on log file 122 are browsed. The acknowledgment process is searching for control records 148 that have an interface system status code greater than or equal to 3.

In a step 724, once a control record 148 with a status greater than or equal to 3 is found, the acknowledgment process looks for a corresponding record 152 in match file 124.

In a step 725, if a match record 152 is found, the process continues at a step 726. If no match record 152 is found, the process continues at a step 727.

In step 727, the acknowledgment process determines whether the transaction is timed out. The transaction is timed out if a time interval between the time a control record 148 was last updated (or added) by status subsystem 106 and the current time exceeds a designated timeout period. Thus, the determination is made by comparing the last update time of control record 148 to the present time. If the time interval exceeds a time-out time stored in master control record 154, in a step 728 the status is set to indicate a time-out has occurred and the control record 148 is finished in error.

If a corresponding match record 152 is not found (step 725) in match file 124, the transaction is not timed out (step 727), and there are additional control records 148 to be browsed (step 729), the acknowledgment process continues at step 722. If a match record 152 is not found (step 725) but the transaction has timed out (step 727), the acknowledgment process continues to a step 728 described below. If a match record is not found (step 725), the transaction has not timed out (step 727), but there are no more control records 148 (step 729), the acknowledgment process is completed.

If, on the other hand, a match record 152 is found (step 725), then in a step 726, the transaction processing system status of match record 152 in match file 124 is read. If this status is pending (not finished), in a step 730, transaction processing system log file 128 is read directly, using the stored RBA, and the transaction processing system status is updated in both log file 122 and match file 124 based on the transaction processing system status of transaction record 158. If the transaction processing system status is finished (step 731), or if the transaction timed out (step 727), in step 728 the control record 148 is finished.

In step 728, control record 148 is finished in one of two ways. In one way, if the transaction processing system status is an error, the interface system status code is set to 9 and the file type to PX. If, however, the transaction processing system status is a success, the interface system status code is set to 8, and the file type to PR. The active control record 148 is deleted and a finished control record 148 (type PX or PR) is added to log file 122.

In a step 732, the acknowledgment process determines if the external application that sent input message 132 corresponding to the subject control record 148 has requested an acknowledgment. An acknowledgment is requested, when a flag in the header of the control record, called SEND_WHAT_STAT in the preferred embodiment, is set greater than zero by the external application. If an acknowledgment was not requested, the acknowledgment process will return to step 722 if active control records 148 still exist to be browsed (step 729), or will complete if no active control records 148 remain (step 729). If, however, an acknowledgment was requested by the external application, the acknowledgment process continues at a step 734.

In a step 734, a copy of the header of finished control record 148 is written to communications log file 126 as an outbound status record 138A. This causes a status message to be sent to the external application. For the case of a simple acknowledgement, outbound status record 138A contains only the header information of control record 148, thus, this is all that is sent to the destination. If an actual data message is to be sent, (i.e. more than just an acknowledgment) the data contents of control record 148 are also written along with the header as outbound data record 138B.

Figure 7C:
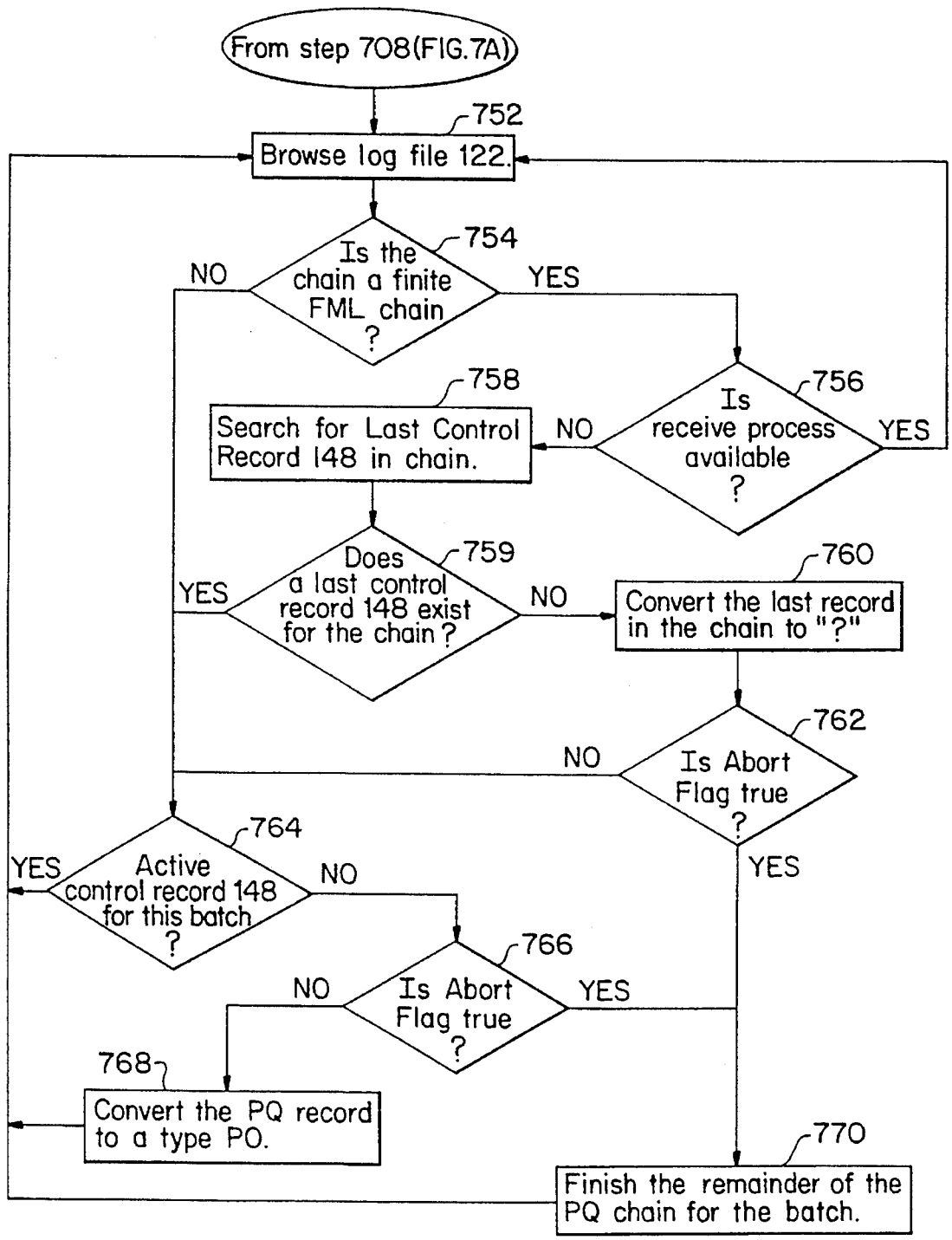
FIG. 7C is a flowchart illustrating how the acknowledgment process performs maintenance on chain records.

FIG. 7C is a block diagram illustrating maintenance performed on chain messages (Type PQ) existing on log file 122. Referring to FIG. 7C, in a step 752, log file 122 is browsed to find chain records (i.e. records of a Type PQ). If no chain records are found the process continues at step 712 (FIG. 7B).

In a step 754, the acknowledgment process determines whether the chain is a finite chain. If it is a finite chain, and a chain flag indicates a first or middle chain record in the chain (F or M, respectively), the acknowledgment process in a step 756 checks to determine whether the receive process is still active. If the receive process is still active, the balance of the chain message may still be in the process of being received. Thus, in this case nothing is done with respect to that particular control record 148 and the acknowledgment process resumes browsing log file 122 for PQ type chain records in a step 752.

If in step 754, it was determined that the chain is not finite, processing also continues at a step 764.

If, on the other hand, control record 148 indicates a finite chain and the receive process is no longer active, the acknowledgment process searches for the last control record 148 of the chain (L) in a step 758. If the last record for the chain does not exist (a step 759), the last control record 148 received in the chain has its flag changed from its current value of either F or M to a question mark in a step 760. Interface system 100 treats this record exactly the same as if it were the last record, but indicates that this record was not received from the external application as the last record.

If in step 759 a last control record 148 does exist for the chain, the acknowledgment process continues at step 764.

In a step 762, an abort flag is checked to determine whether that chain should be aborted by interface system 100 if an error occurs (i.e., whether abort flag is true). If the abort flag is true, all remaining links of the chain are aborted because of an error earlier in the chain exactly as though an error occurred in each link in the chain. If, however, the abort flag is not set to true, processing continues at a step 764.

In step 764, the batch number for each PQ record found is checked to see if there is an active control record 148 of the type PO having the same batch number. If a PO record is found for the batch, nothing is done, and processing resumes at step 752. If, on the other hand, a PO control record 148 for the batch is not found, the abort flag in the header of the PQ record is tested in a step 766. If the abort flag does not indicate that the records are to be aborted if an error occurs, the process continues at a step 768. If however, the abort flag indicates the records are to be aborted, that PQ chain record and all subsequent records of the same batch number are finished as error records in a step 770.

In step 768, the PQ record is converted to a PO record by adding an active control record 148 (type PO) and then deleting the PQ record.

At this point the acknowledgment process will resume browsing log file 122 for PQ chain records in step 752.

3.4 Outbound Function Subsystem

The outbound communications function is performed by communications subsystem 114 and communications monitor subsystem 110. Outbound communications is divided into different classes depending on whether the destination of the outbound communications is a batch-oriented or an on-line system. The process of communications monitor subsystem 110 is to take outbound messages 140 from communications log file 126 (e.g. outbound status record 138A or outbound data record 138B, generated by acknowledgment subsystem 108) and deliver them to the external application that sent input message 132. This process is for online users only. Batch input is not acknowledged by interface system 100 in the preferred embodiment of the invention. It should be noted, however, that there are schemes within transaction processing system 180 for the application ABAP to generate an outbound data transmission which functions as an acknowledgment.

Figure 8:
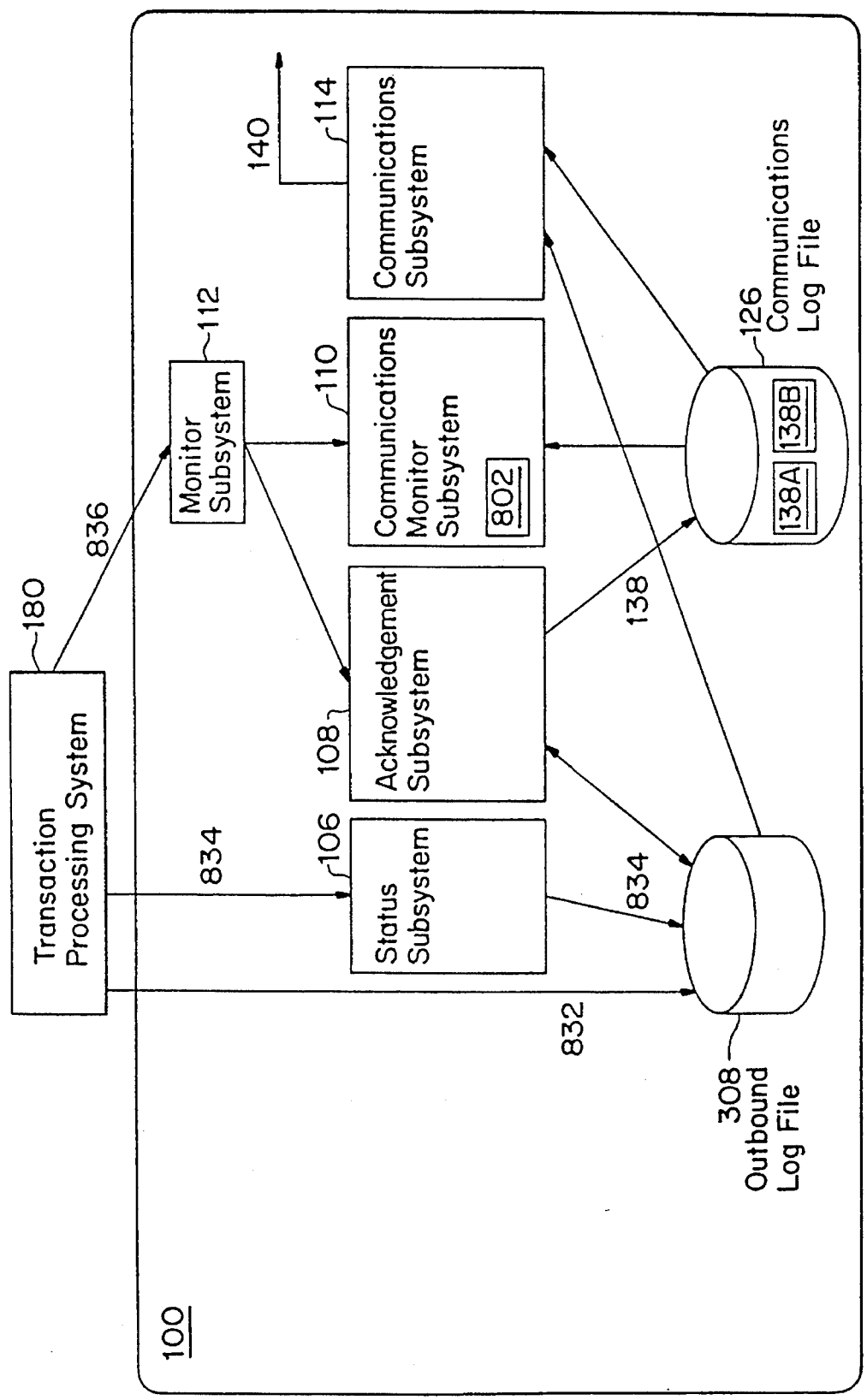
FIG. 8 is a block diagram illustrating outbound communications of the interface system according to the present invention.

A block diagram of the outbound function is shown in FIG. 8. Communications subsystem 114 and communications subsystem 110 process outbound control records 138 from acknowledgment subsystem 108. These include outbound status records 138A and outbound data records 138B. An outbound status record 138A results in an outbound status message 140A which is simply a header message with no data. Outbound status message 140A is analogous to a return receipt card from the U.S. Postal Service. It indicates an input message 132 was received and indicates whether processing completed successfully or in error. An outbound data record 138B results in an outbound data message 140B which is a full message including a header and data.

When the destination system is a batch system, outbound data record 832 is written to an outbound log file 308, and an output control record 834 is submitted to status subsystem 106 for addition to outbound log file 308. Then a stream of Job Control Language (JCL) statements is submitted to an internal reader existing within an MVS operating system that hosts the CICS region. The JCL statements initiate a step to run a batch program within MVS to extract the data from log file 122 and create a sequential file. The sequential file exists on disk, and is created in batch with no index. The data is then transmitted to the destination system using a batch data mover. Although all of this JCL process is outside the scope of the interface system 100, it uses outbound log file 308. The batch JCL stream also contains a final step to communicate to interface system 100 that the transmission has been completed. The purpose of this is to finish the output control record 834 created above. The active output record 834 is used in this case only to allow troubleshooting to be carried out in a manner identical to online output communications.

When the destination system is an on-line system, one or more output data records 832 are written to the outbound log file 308 and an output control record 834 is created exactly as it is for batch above. Then the data is communicated via either an LU6.2 or an LU6.1 protocol from interface system 100. The logic for communicating with other CICS regions (LU6.1 protocol) differs slightly from that described for outbound processes below (LU6.2). These protocols are industry standard protocols. However, the differences are not material to understanding the flow of data.

Communications tasks may take a significantly longer time to execute than the other processes in the interface system. Because of this, it is desirable to have multiple communications tasks executing concurrently. Because of the ability to have multiple simultaneous communications tasks and the fact that only one communications task may exist for a specific destination at one instant in time, it is necessary that communications monitor subsystem 110 have the ability to manage multiple communications tasks.

In this section of the patent document, the outbound function according to the present invention will be described. The process of sending data messages from the transaction processing system could be handled without use of the interface system 100 according to the present invention. However, according to a preferred embodiment of the present invention, outbound processing will be performed using interface system 100. This allows interfacing with external applications to be performed using a single methodology (the same methodology as the status acknowledgments of inbound messages) and to provide a single point of control.

Figure 9:
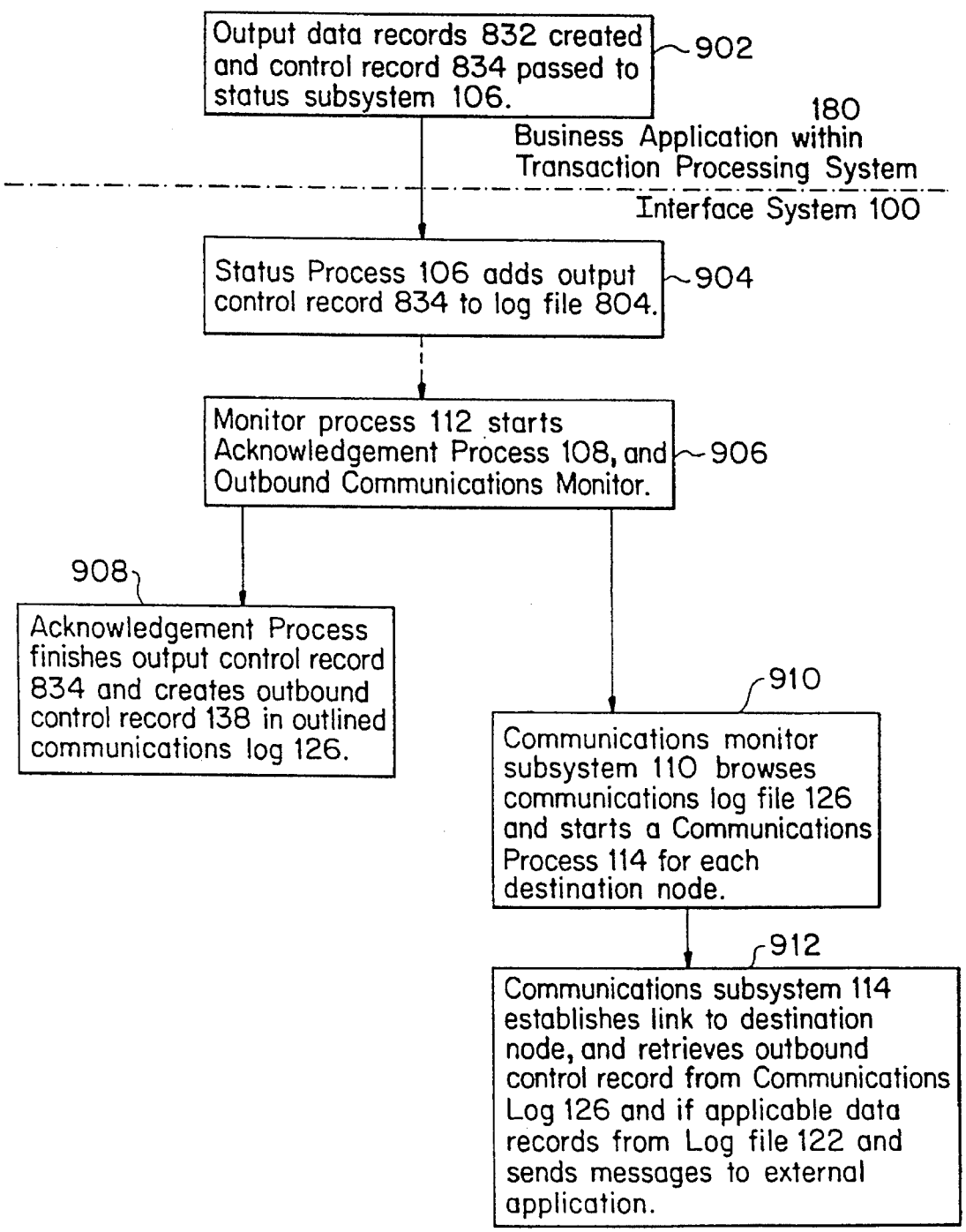
FIG. 9 is a flow chart illustrating the operation of an outbound communications process.

FIG. 9 is a flow chart illustrating a high-level overview of the steps involved with outbound processing. Referring now to FIGS. 8 and 9, outbound processing according to the present invention will be described.

In a step 902, a business application program in transaction processing system 180 is triggered by some event. The event may be a user at a terminal running a specific transaction that causes an output data record 832 to be created, or may be running some other transaction which, as a portion of its task, creates an output data record. The event may also be the arrival of an inbound message that triggers such an event.

According to an embodiment of the present invention, output log file 308 of interface system 100 is a separate logical database from inbound log file 122, but they are the same physical file. In an alternative embodiment, output log file 308 and log file 122 may indeed be separate physical files. Output data records 832 are created by the business application program with a data type of P0 (zero), a unique batch number, and a serial number in ascending sequence.

When creation of output data records 832 is complete, an output control record 834 is created by the business application program and is passed to the status subsystem 106 for addition to outbound log file 308. Output control record 834 is only a header. It is a file type PM, and it contains a count of the number of output data records 832. Alternatively, when a single output data record 832 comprises the entire message, the data may be included in output control record 834 and no output data records 832 written to outbound log file 308.

In a step 904, output control record 834 is also stored on interface system output log file 308. As soon as output control record 834 is present on output log file 308, interface system 100 is free to attempt to deliver output data records 832 to the recipient.

In a step 906, monitor subsystem 112 starts acknowledgment subsystem 108 and communications monitor subsystem 110.

In a step 908, acknowledgment subsystem 108 browses output log file 308 (and log file 122 shown in FIG. 1 and discussed above with respect to FIGS. 1 and 7). Acknowledgment subsystem 108 browses all active output control records of type PM (outbound) with an interface system status code having a value less than 6. As discussed above, if the interface system status code is less than 6, the record has not been processed by acknowledgment subsystem 108.

Acknowledgment subsystem 108 updates the interface system status code to 8 or 9, and changes the file type to PS, indicating that the output control record 834 is finished. By changing the file type, finished output control record 834 is moved out of the pool of active output control records 834, minimizing the number of output control records 834 that are browsed each time the process executes. Acknowledgment subsystem 108 creates an outbound control record 138 and places it in communications log file 126. Each outbound control record 138 includes data indicating a destination node to which the message is to be sent.

In a step 910, communications monitor subsystem 110 browses communications log file 126 searching for outbound control record 138. For each destination node, communications monitor subsystem 110 starts a communications process in communications subsystem 114.

In a step 912, communications subsystem 114 establishes a link to each destination node. Communications subsystem 114 retrieves an outbound control record 148 from communications log file 126 and, if applicable, output data records 832 from outbound log file 308, and sends outbound messages 140 to the external application.

3.4.1 Communications Monitor Subsystem and Process

Figure 14:
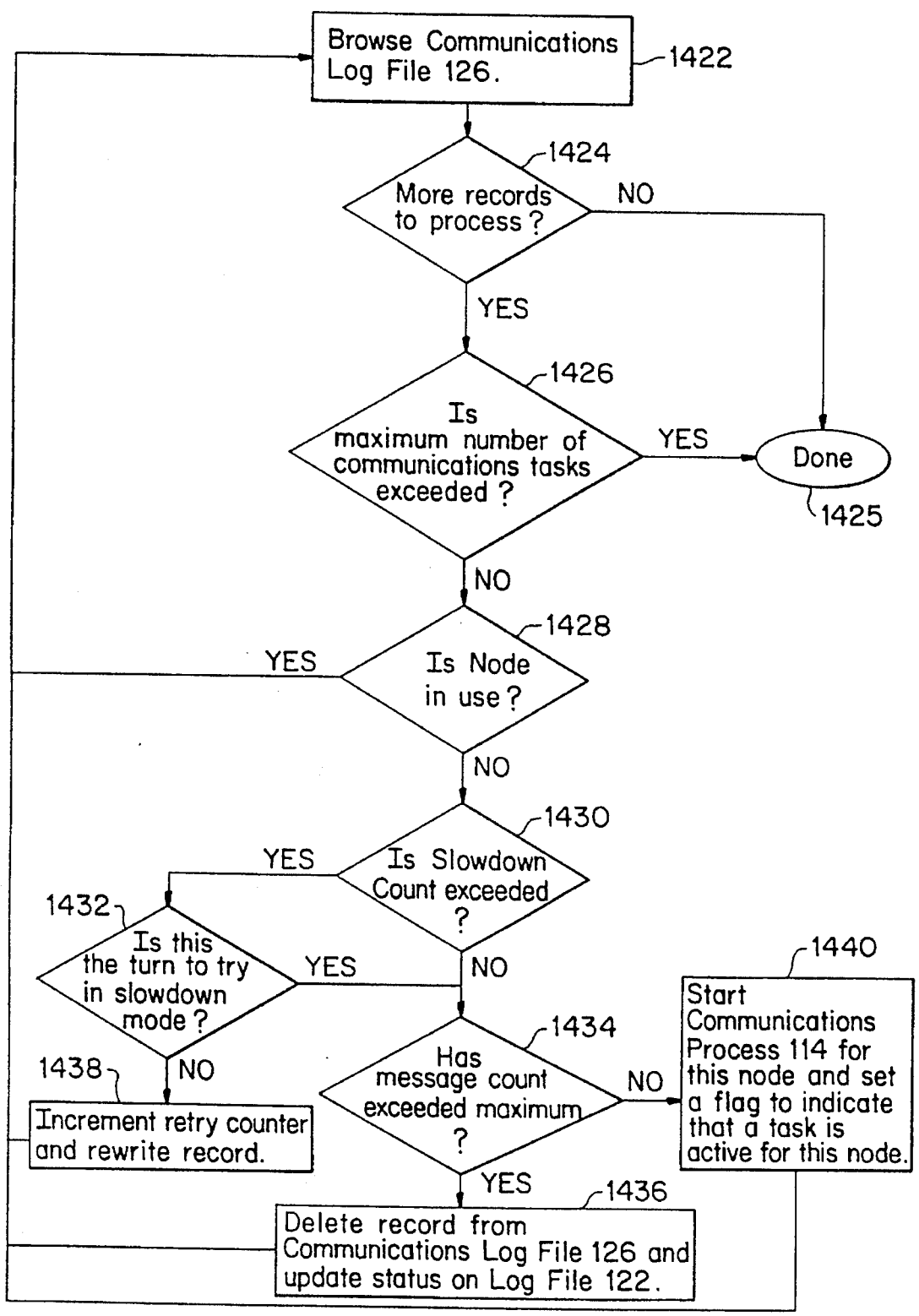
FIG. 14 is a flowchart illustrating the communications monitor process.

FIG. 14 is a flow chart illustrating the communications monitor process. Referring to FIG. 14, in a step 1422, communications monitor subsystem 110 is started by monitor subsystem 112. Communications monitor subsystem 110 browses communications log file 126. If no more outbound control records 138 exist in outbound communication log file 126 (a step 1424), the outbound communications process is completed (a step 1425). If, however, outbound control records 138 are found, the process continues at a step 1426. In step 1426, communications monitor subsystem 110 checks interface system 100 master control record 154 to see if the number of communications tasks has exceeded an installation-defined limit. If it has, the process terminates at step 1425. This limit allows the installation to prevent too many long running communications tasks from executing at the same time and locking up resources. If it has not exceeded the maximum number of tasks, the process continues at a step 1428.

In step 1428, a check is made to see if a communications task is already executing for the specified destination node. If a task already exists for this node, the process continues browsing the communications log file 126 in a step 1422 looking for other outbound control records 138 that require an output message 140 to be sent. If a task is not in progress, the process continues in a step 1430.

In step 1430, the communications monitor process checks to see if the number of retries for this message has exceeded an installation defined "slowdown count." If a destination application is not available, this allows interface system 100 to retry the external system at a much lower frequency, thus allowing other destinations a chance without exceeding the maximum task count.

If the slowdown count has been exceeded, in step 1432 the process checks to see if it is the proper time to try to connect to the destination again. If either it is the proper turn or the slowdown count has not been exceeded, in a step 1434 a check is made to see if the number of retries has exceeded a specified limit, which in the preferred embodiment is 3000 tries. If, however, the slow down count has been exceeded (step 1430) and therefore the frequency cannot be lowered and it is not time to try in the slowdown mode (step 1432), in a step 1438, the outbound control record 138 is rewritten and a counter indicating the number of retries (retry counter 802) is incremented. At this point, processing resumes at step 1422.

If the maximum retries has been exceeded in step 1434, in a step 1436 the outbound control record is deleted from the Communication Log 126 and the status of the finished control record 148 on log file 122 is updated to indicate the communications attempt failed.

If the record to be serviced is an acknowledgment of a finite chain, and it is either an F or an M, it is skipped temporarily. If it is the F record, its key is saved until the L record is found and then the key is included with the L record when passed to the Communication process.

If the number of retries has not exceeded the maximum limit (step 1434), in a step 1440 a Communications subsystem 114 is started and a flag is set to indicate that a task is in progress for this destination.

3.4.2 Communications Subsystem and Process

Figure 10:
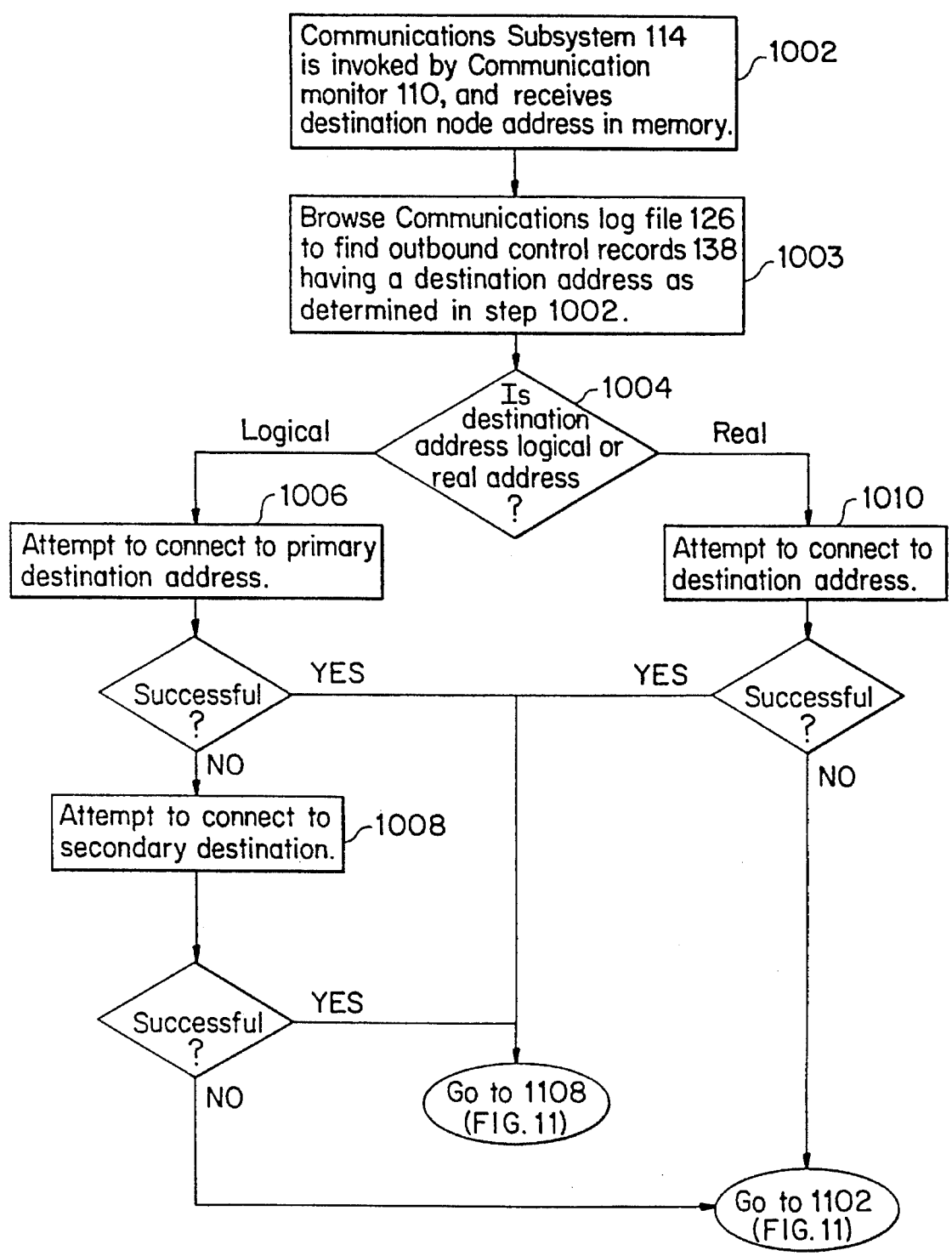
FIG. 10 is a flow chart illustrating the method by which the interface system communicates to an external application.
Figure 11:
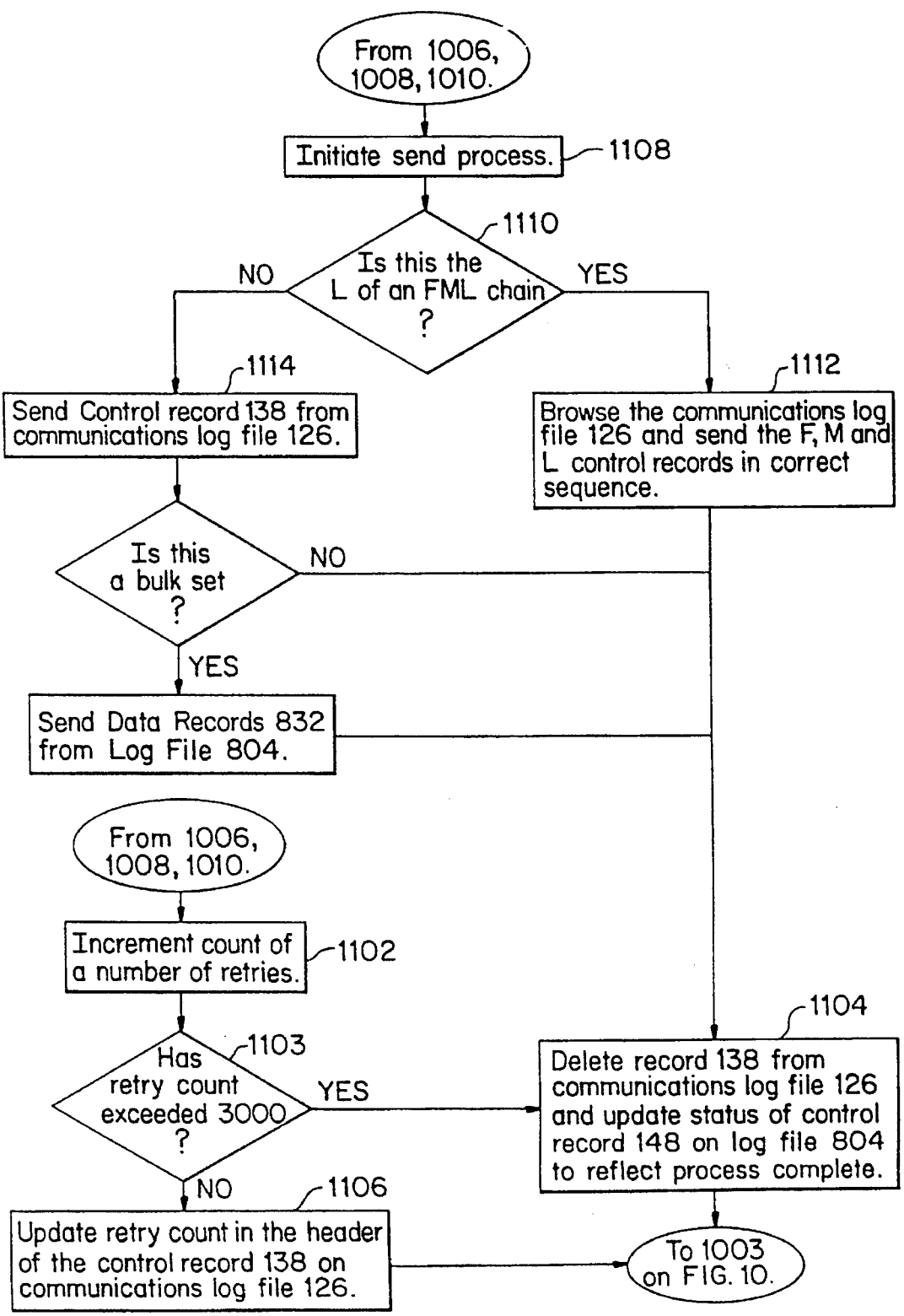
FIG. 11 is a continuation of FIG. 10.

FIGS. 10 and 11 are flow diagrams illustrating details of communications subsystem 114 and its process.

Referring to FIG. 10, in a step 1002 when communications subsystem 114 is invoked, it receives a destination address. This address resides in a passed data area in memory provided by CICS. This address may either be an indirect destination address or a direct destination address. A direct address is an actual node name contained in a CICS table. An indirect address is a logical destination which may have one or two real alternative addresses.

In a step 1003, communications subsystem 114 browses outbound communications file 126 looking for an outbound status record 138A or an outbound data record 138B having a destination address matching the address received in step 1002. In a preferred embodiment, outbound records 138A, 138B are stored in communications log file 126 in order of their destination address.

In a step 1004, communications subsystem 114 determines whether a destination field contains a direct or an indirect mode flag by the presence of an asterisk as the first character of the address. The presence of an asterisk character indicates that the address is indirect or logical. In this case, two destination nodes, a primary and a secondary (or backup) node, may be specified in other fields in the control record header.

If the address is indirect, in step 1006 the process attempts to connect first to the primary node address. If such an attempt is unsuccessful, in a step 1008, the process then attempts to connect to the secondary node address.

If in step 1004 the process determines the address is direct (real), in a step 1010, the address field is itself a physical node address and the communications process attempts to connect to the destination using this address.

In step 1006 or 1008 or 1010, communications subsystem 110 attempts to establish a link to the external process system. This is done by use of the appropriate commands for the protocol being used. If the link to the external computer system is not successfully established, the process continues at a step 1102.

In step 1102, when interface system 100 has failed to establish a connection, a count of the number of retries is incremented by 1. When this count exceeds a pre-specified threshold (e.g., 3,000) (step 1103), the outbound control record 138 is deleted from outbound data file 126 in a step 1104. According to an embodiment of the present invention using a cycle time of 45 seconds for the monitor subsystem 112, this would take approximately 37.5 hours.

If, however, the count of the number of retries is less than the threshold, the outbound control record 138 is updated on the outbound communications file 126 in a step 1106.

If communications module 110 successfully connects to the destination address in step 1006, 1008, or 1010, the process continues at a step 1108. In step 1108, when the connection is successful, a send process is initiated. There are three possible cases for the send process. There is a bulk message case, a chain message case, and a self-contained message case.

In a step 1110, communication process module 110 looks at outbound control record 138 flags in outbound communications file 126 to determine if a record is a the last record of a chain message chain. If a CHAIN-MAIL flag is L, this indicates that this is the last or only outbound control record 138 of a finite chain acknowledgment in outbound communications file 126.

If the present record is the last record of a finite chain the process continues at a step 1112.

In step 1112, the process browses communications log file 126 to obtain and send all messages of the chain mail message in the proper sequence. The key from the F record from the beginning of the chain is used to start a browse, and the F, M, and L headers plus a length field are sent. When an L record is encountered, an option is set to confirm receipt using LU6.2 protocols.

If the record is not an L record in an FML chain, in a step 1114, an outbound control record 138 is sent from communications log file 126 to communications subsystem 114.

If a BULK-MAIL flag is set, this indicates that the record in outbound log file 126 represents a collection of output data records 832 on interface system outbound log file 308. If this is a bulk message set, output data records 832 are sent from log file 308 in a step 1116.

In step 1104, if the outbound control record 138 in outbound communications file 126 is a self-contained message, or if output data records 832 for a bulk set have been sent, output log file 308 records the structure with header and data portions is sent with a CONFIRM parameter.

When an output message 140 is sent error free, the outbound control record 138 is deleted from communications log file 126. Additionally, the finished outbound control record 138 (type PS) on communications log file 126 file 804 is read and its status is changed to indicate that it has been communicated. Communications process module 110 continues browsing outbound communications file 126 at step 1003 and processing further records.

If an error is encountered while sending a communication, a command called ISSUERROR is sent to the external application using LU6.2, and a return code is set to indicate a non-recoverable error.

Once the return code has been set to indicate that a non recoverable error has occurred, a count of the number of retries is incremented by 1. Once this count exceeds the threshold 3,000 the record is deleted from outbound communications file 126. As long as the count is less than 3,000 the record is updated on the outbound communications file 126. A field COM-TRAN is set to high-values in the browse key so that any remaining records from the same node are skipped. LU6.2, in general, does not actually transmit data until it has a full buffer available to send. Thus, a connection is not actually made until the first buffer is ready to send, and therefore, the interface system 100 may not receive an indication of an error until several commands after the command that caused the error. It is not practical to turn the line around on every record sent so when an error is encountered both entities will back out of the entire batch.

4. Monitor Process

Figure 15:
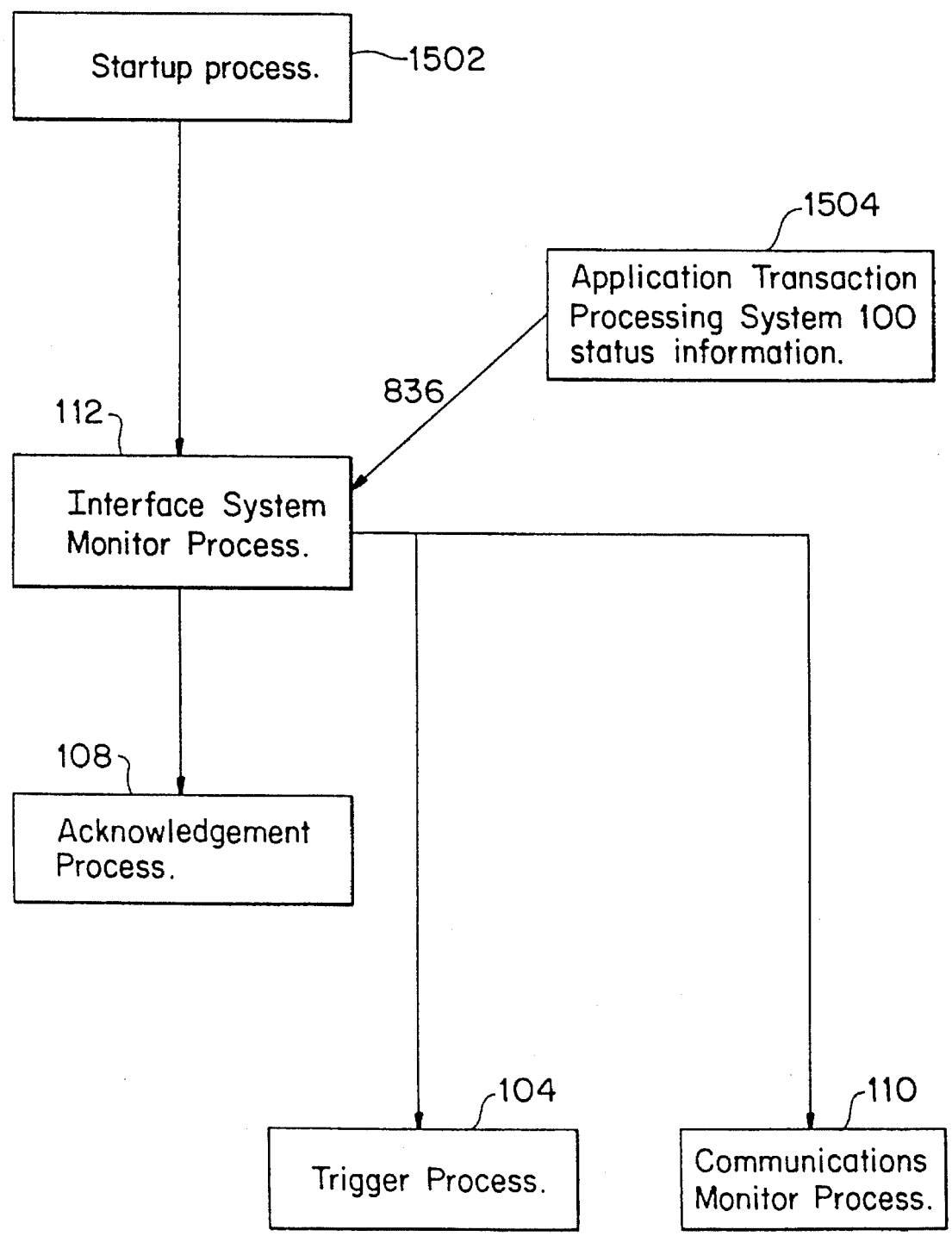
FIG. 15 is a block diagram illustrating a monitor subsystem according to the present invention.

As discussed previously in this patent document, monitor subsystem 112 provides timing strobes (events) necessary to initiate certain interface system processes. FIG. 15 is a high level block diagram illustrating monitor subsystem 112 and its interfaces. Monitor subsystem 112 is initially started by a startup process 1502, described below. It then examines status information from the transaction processing system 180, to determine if it is available or not. The monitor process starts three other processes, the acknowledgment process, which is started immediately, and the trigger process and communications monitor process, which are both started after a 5 second delay. This delays gives the acknowledgment process a chance to complete its tasks.

Figure 16:
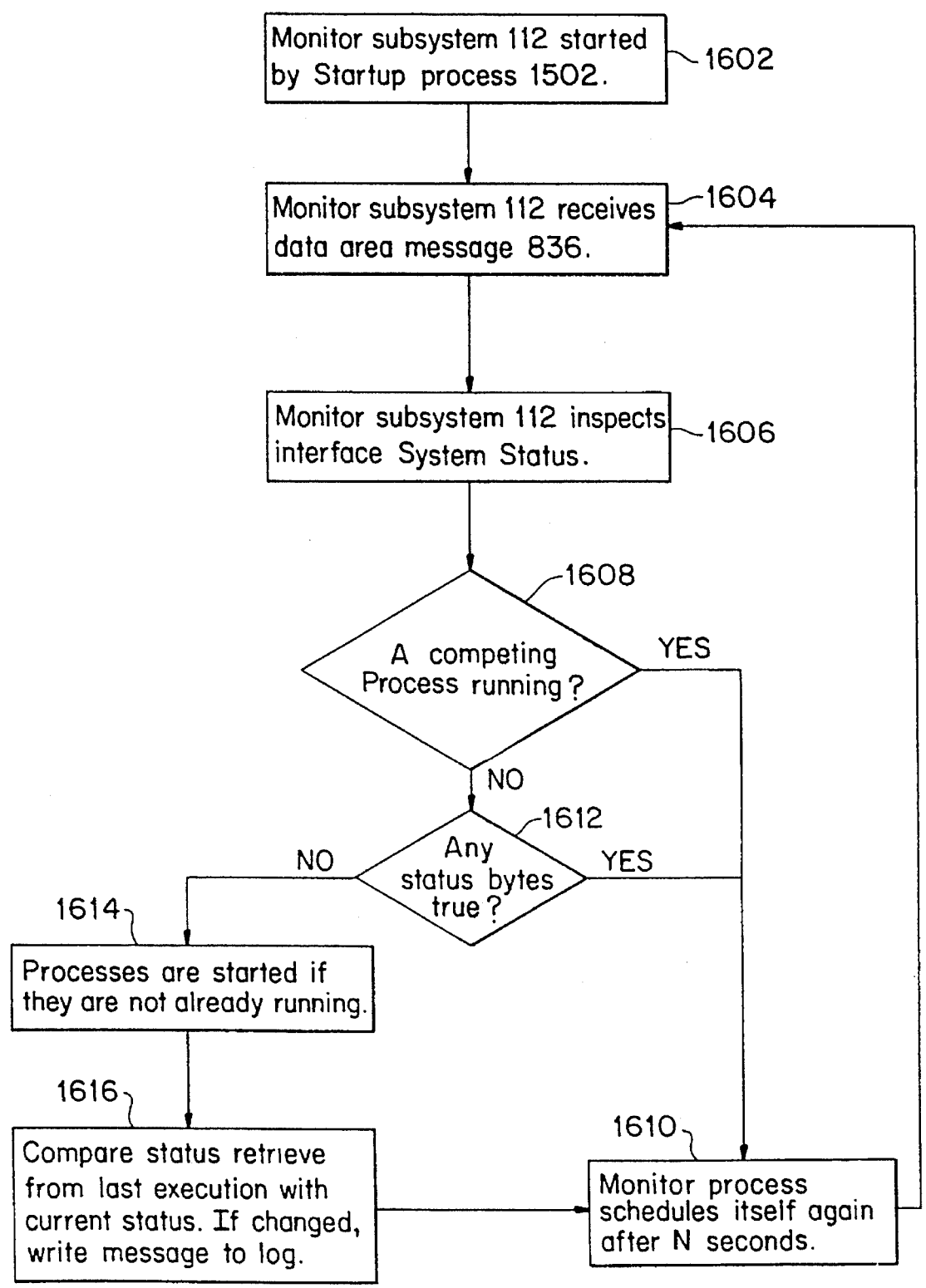
FIG. 16 is a flow chart illustrating the operation of the monitor subsystem.

FIG. 16 is a flow chart illustrating the steps taken by the monitor process module in completing its process. Referring to FIGS. 8, 15 and 16, the monitor process module will now be described.

In a step 1602, monitor process subsystem 112 is initially started by a startup process 1502. Once monitor process subsystem 112 is started, it continues to run automatically, self-starting at a regular timed interval. This timed interval is pre-specified by each installation, using a transaction "YSPM" in transaction processing system 180 to send a status message to the status process 106. This interval is stored in log file 122. According to a current embodiment of the present invention, the initial default supplied for the time interval is 45 seconds. The "YSPM" transaction is used to update master control record 154 and to delete an unwanted control record 148 by sending a pseudo-status code.

In a step 1604, monitor subsystem 112 receives a data area message 836 passed either from startup task 1502, or from a previous execution of the monitor process. Data area message 836 contains status bytes from the previous execution of monitor subsystem 112, which will be compared with the present values of the status information to detect changes in status. Startup task 1502 always passes binary zero values. This forces a change in the status values on the first execution of monitor subsystem 112. Monitor subsystem 112 passes these values to the subsequent execution. The status bytes are described below.

In a step 1606, monitor subsystem 112 determines whether competing tasks are running. This is accomplished by monitor subsystem 112 querying interface system 100 for data about itself (monitor subsystem 112) and about the trigger process 104 and acknowledgment subsystem 108. If another copy of the monitor process is currently running (step 1608), this new copy terminates. If either the trigger process or the acknowledgment process is running, monitor subsystem 112 reschedules itself in a step 1610.

If a competing process is not running, in a step 1612 monitor subsystem 112 tests the value of four status bytes. Monitor subsystem 112 establishes addressability to a transaction processing system data area in high memory where the status bytes are stored by using a standard command supplied by the host transaction processing system (CICS).

The statuses checked are:

Is the transaction processing system not active;

Is the transaction processing system update task not active;

Is the transaction processing system initializing; and

Is the transaction processing system an 'emergency' system only?

If any of the statuses are true, or if either log file 122 or the communications log file 126 is closed, monitor subsystem 112 jumps to the end of the process and reschedules itself.

In a step 1614, monitor subsystem 112 schedules initiation of the acknowledgment process, the trigger process, and the communications process. In a preferred embodiment, monitor subsystem 112 first schedules acknowledgment subsystem 108 to execute immediately. Monitor subsystem 112 then schedules trigger process 104 and communications monitor subsystem 110 to execute five seconds later. The five second delay allows acknowledgment subsystem 108 to finish in case it generates any additional work for trigger process 104 or communications monitor subsystem 110. Trigger process 104 and acknowledgment subsystem 108 may execute concurrently.

In step 1610, monitor subsystem 112 schedules itself to run again. Status bytes from the current execution are passed on to the next execution. The time at which monitor subsystem 112 is scheduled to run again is determined from the time interval stored in log file 122 master control record.

In a step 1616, the status bytes from the previous execution are compared to the status bytes for the current execution. If these status bytes are different, the status has changed and a message is written to interface system log file 122 indicating that the change has occurred. This is an informational step only and is used to facilitate troubleshooting.

5. Startup Of Interface System

The interface system according to the present invention is intended to be a self-starting system. There are no procedures external to CICS that must be followed. Toward this end, a startup module exists and is controlled by the Program Load Table (PLT) in the CICS.

Note, there is no specific shut-down logic for the interface system according to the present invention. During normal operations, the interface system monitors the transaction processing system's status. When the transaction processing system is not processing, the interface system goes into a dormant mode. In this mode, the interface system only monitors the transaction processing system waiting for it to begin processing again.

Figure 17:
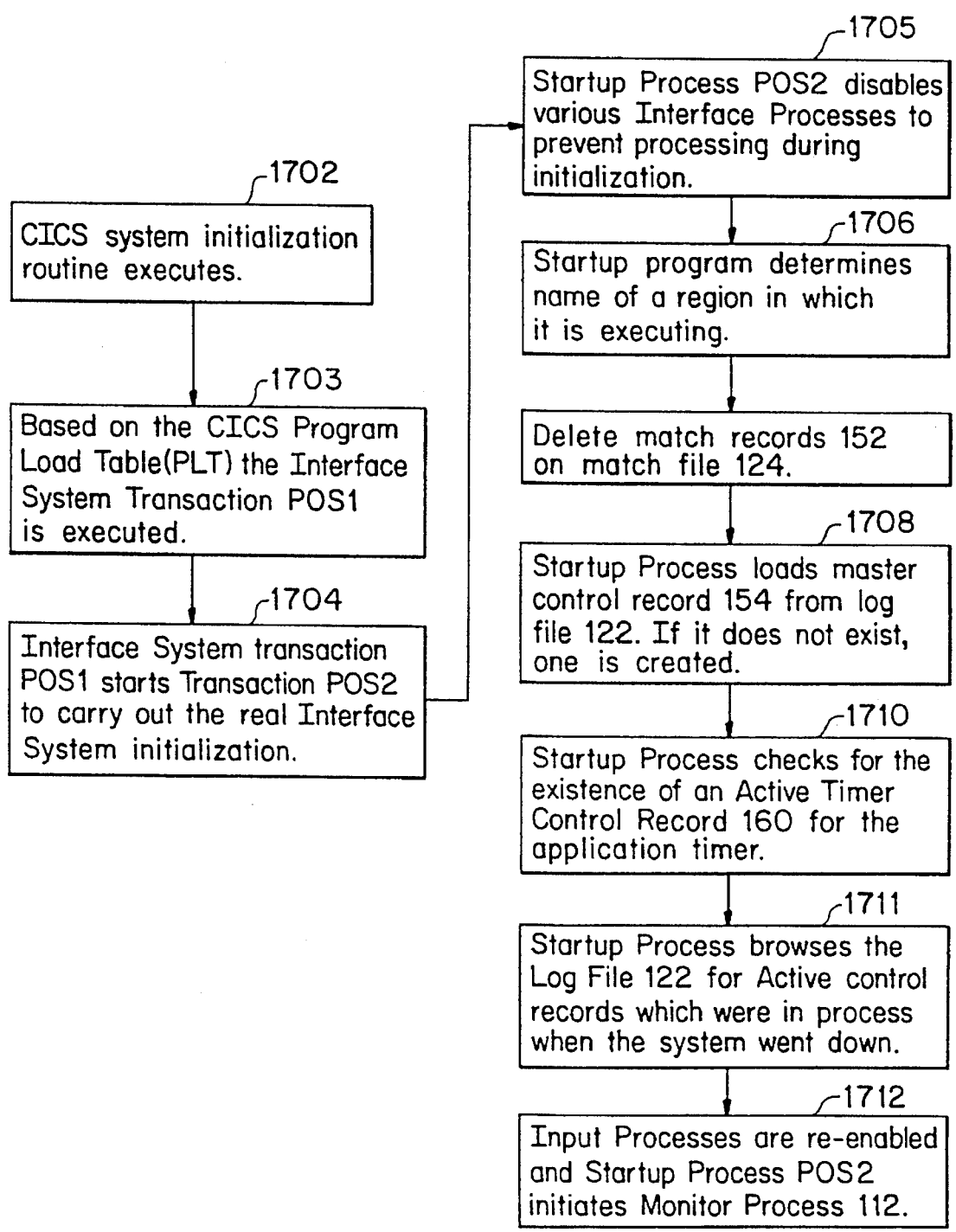
FIG. 17 is a flow chart illustrating a process of CICS startup.

FIG. 17 is a flow chart illustrating the steps taken when CICS starts up. Referring now to FIGS. 1 and 17, in a step 1702, CICS startup is initiated. In step 1703, PLT table entries for startup are processed. The interface system 110 entry for process is for a transaction named POS1.

In a step 1703, transaction POS1 executes. In executing, in a step 1704, POS1 starts a transaction named POS2 (step 1704). Note, if a transaction started by the PLT does not execute successfully, CICS will not start up. Therefore, the minimum processing necessary is performed in POS1.

Execution of POS2 is a multi-step process. First, in step 1705 POS2 disables input receive subsystem 102. As a result, inbound messages 132 will not be processed while the log file 122 is being processed for startup. This actually disables the modules behind the transactions rather than disabling the transactions themselves.

In a step 1706, a startup program determines the name of a region in which it is executing and writes this name to a temporary storage queue. This is done so that the batch receive module of input receive subsystem 102 knows the region in which it is executing. In alternative embodiments, this could be done directly by the batch receive module program.

In a step 1707, all match records 152 on match file 124 are deleted. As a result, match file 124 will be rebuilt the first time the acknowledgment subsystem 108 executes.

In a step 1708, the startup program loads the master control record 154 from log file 122. Alternatively, if master control record 154 is not found execution continues at step 1710. If master control record 154 is not found, a new PC record is created using default values. This is significant in that automatic batch numbering and serial numbers will start from zero and the unique user IDs generated in the trigger process will start over. If records exist on the transaction processing system log file from previous sessions, there is a very small probability that conflicts can develop due to duplicate user IDs. The reason the probability is small is for a conflict to occur, the same batch number and serial number must be used together. In such a case, the old record would be found by the acknowledgment process before the transaction actually ran.

In a step 1710, the startup process POS2 checks for the existence of an active timer control record 160 for an application timer. If one does not exist, POS2 creates one.

In a step 1711, startup process POS2 browses log file 122 for active control records 148 that were in process when the system went down. If appropriate, record status is reset to force trigger task to reprocess. If a regular or chain records are found with a status of 3 or 4, they are assumed to have not completed. In this case, an ODC TD queue buffer will be resubmitted. This is accomplished by setting the status of the active timer control record 160 back to a value of '2' which causes the trigger process to consider the record eligible for submission on its next execution.

If a bulk message is found, and its ABORT_FLAG is not set, its status value is checked. If its status value is 3, the message is assumed to have never reached the stage where the batch file was built. In this case, the ODC must be resubmitted by setting its status back to 2. If, however, the bulk mail message status is 4, the batch is assumed to have been built, and a restart command is issued.

In a step 1712, the input processes are re-enabled by enabling the modules for these processes, and monitor subsystem 112 is started.

6. Shutdown

As mentioned previously, there is no formal shutdown procedure for the interface system according to the present invention. The interface system according to the present invention is designed to shut itself down automatically during a normal CICS shutdown. Included, however, is a method to stop the interface system from submitting any more new work to the transaction processing system in preparation for its shutdown or nightly cycles. This allows the transaction processing system to finish work in process without starting anything new.

The automatic shutdown of the interface system according to the present invention will be generally described. When transaction processing stops processing, or when the update task stops, the interface system 100 monitor subsystem 112 stops scheduling a trigger process 104, acknowledgment subsystem 108 and outbound communications subsystem 114. Input receive subsystem 102, however, continues to execute, receiving and storing messages on log file 122.

When it is desired to stop interface system 100 from submitting new work to transaction processing system 180 in preparation for shutdown, a batch job is run using the SYSB utility to send a message to the trigger task of 'BLOCK P05' and 'UNBLOCK P05'. This causes a flag to be set or cleared in the master control record, and trigger process 104 detects the value of this flag and acts accordingly.

7. File Reorganization

In interface system 100 according to the present invention, a batch cycle is used to maintain log file 122, and to purge unwanted records on a periodic basis. Reorganization steps are dependant on the file access methods used. In an embodiment, IBM's VSAM file access method is employed; however, other file access methods are suitable and would have different reorganization requirements. According to an embodiment, the batch file is intended to be run on a daily basis, however, this interval could be altered to suit alternative environments.

The batch cycle is divided into two job control language streams. The first job processes both log file 122 and outbound communications file 126. The second batch job processes only log file 122. There is no explicit reorganization for match file 124.

Match file 124 is designed to be self-maintaining, kept on-line, and always cleared upon startup of CICS. Outbound communications file 126 is simply exported and re-imported, to allow free space to be redistributed, with the export kept as a backup.

Figure 18:
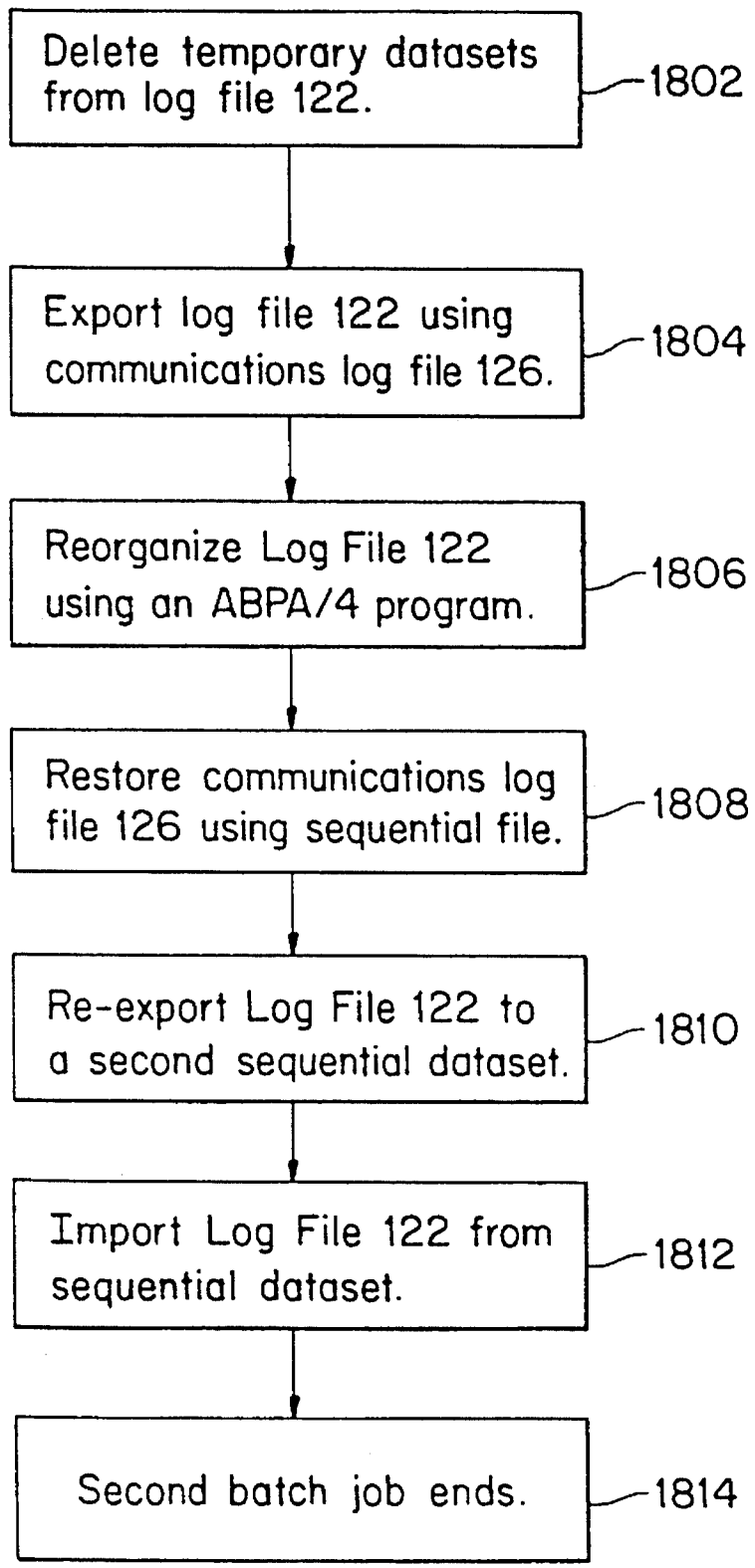
FIG. 18 is a flow chart illustrating the steps involved with a batch cycle that is used to maintain an interface system log file.

FIG. 18 is a flow chart illustrating the steps involved with the batch cycle used to maintain log file 122. Referring to FIGS. 1 and 18, this process will now be described. In a step 1802, all temporary datasets on log file 122 are deleted. In a step 1804, log file 122 and outbound communications file 126 are exported to a sequential dataset.

In a step 1806, log file 122 is reorganized by a batch ABAP4 program. This reorganization involves purging records no longer needed. This process will be further described below with reference to FIG. 19.

In a step 1808, the sequential file from the export of outbound communications file 126 is used to restore outbound communications file 126. Once outbound communications file 126 has been restored, this first batch job ends. At this point the second batch job is ready to begin.

In a step 1810, in the second batch job, log file 122 is again exported to another sequential dataset. In a step 1812, log file 122 is restored with an imported file. In a step 1814, the second batch job ends.

Figure 19:
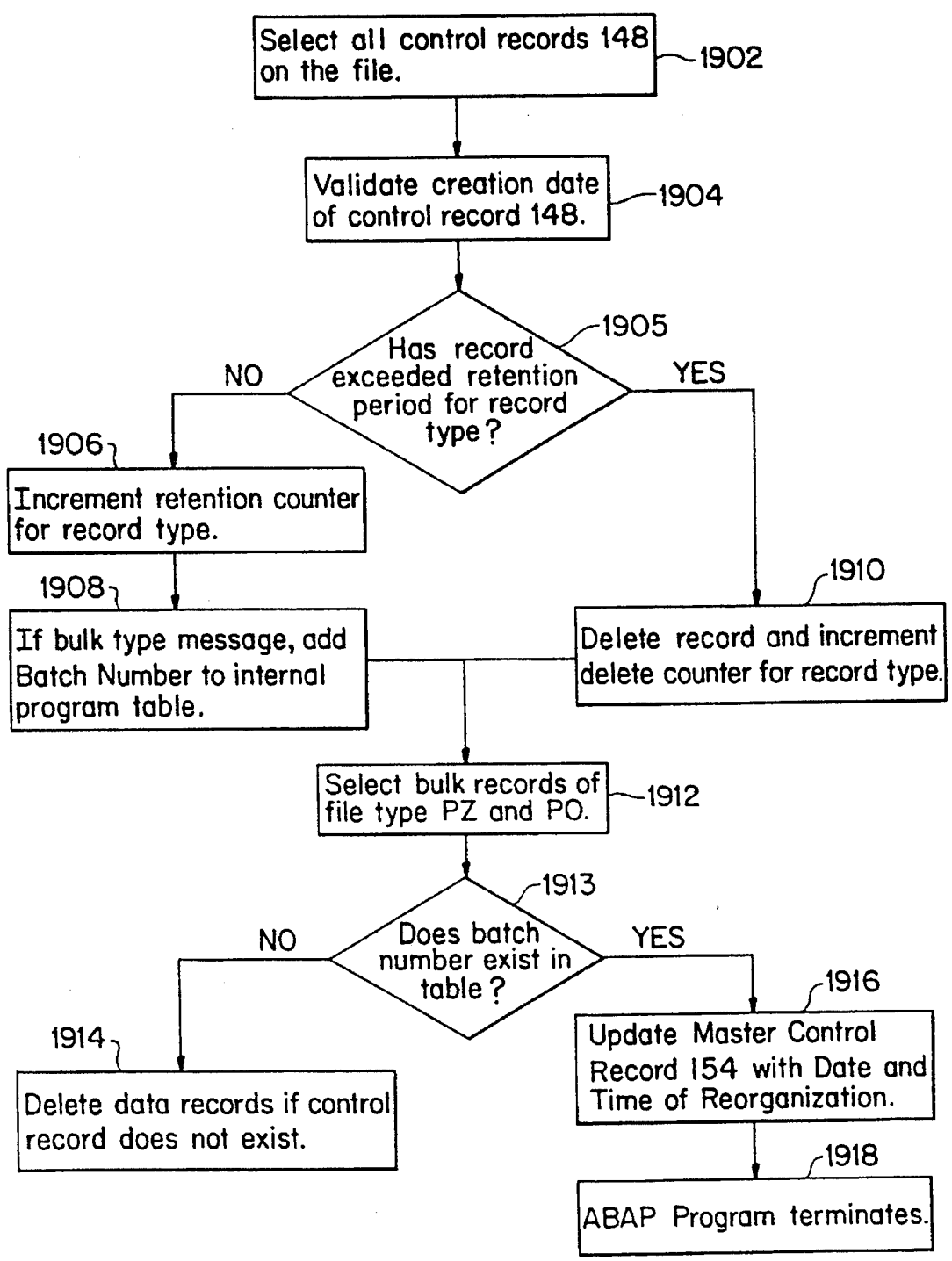
FIG. 19 is a flow chart illustrating the method of a reorganization ABAP program used to reorganize the log file.

The reorganization in step 1804 will now be described in more detail. The goal of this reorganization is to clean up any records that do not have valid date time stamps or data records that do not have corresponding control records, and to purge out-of-date records. FIG. 19 is a flow chart illustrating the method of this reorganization. The reorganization is performed in two phases. Referring to FIGS. 1 and 19, the first phase of this program will now be described.

In a step 1902, the ABAP program selects all control records 148 of log file 122. If the ABAP program finds a finished record it keeps the record for one day then deletes it. If a record is finished in error, it is deleted after three days. The file type of the record selected is examined. If the file type is the master control (PC) record 154, it is skipped. If the record is of any other type, the process continues with a step 1904.

In step 1904, the creation date of the record is validated. If the date is not valid, the record is deleted. If the date is valid, the difference between the creation date and the current date is calculated. If this date differential calculated in step 1904 exceeds the residency time for the specific file type (step 1905), the record is deleted in a step 1910. Additionally, in step 1910, a delete counter for that file type is incremented. If the data differential does not exceed the residency time (step 1905), a retention counter for that file type is incremented in a step 1906. This process occurs for all control records.

In a step 1908, if the record was not deleted and it represents a bulk message, its batch number is appended to an internal table for use in the second phase of the reorganization. This completes phase 1.

In phase two of the reorganization, data records for bulk sets are processed, and any bulk data records without matching control records (represented by entries in the internal table appended in step 1908) are deleted. Because expired bulk control records were deleted in the first phase, and not added to the internal table in step 1908, their data records are dealt with here.

In a step 1912, the ABAP program selects bulk data records of type 'PZ' or 'P0'. In a step 1913, the batch number of each record is checked in the internal table. In a step 1914, if the batch number does not exist in the internal table, all of the bulk record for that batch number are deleted.

If all the bulk records are processed, in a step 1916, log file 122 master control record 154 is read. The creation date and time fields of this PC control record are updated with current date and time information. Thus, these fields always show the date and time that the file was last reorganized. In a step 1918, the ABAP program terminates.

8. Display Function

The interface system according to the present invention is provided with a feature that allows records 148, 136 on log file 122 to be selected for display based on file type, batch number, serial number, client information, or time and date of update. This feature is not required for the operation of interface system 100 but is invaluable in troubleshooting. The primary tool for monitoring interface system 100 is referred to as a YSPO transaction and is implemented in the transaction processing system 180.

The monitoring process follows most conventions of the transaction processing system 180. It displays a list screen, and allows selection of a line to display a detail screen.

A first screen displayed upon entering the monitoring process is called the primary selection screen, shown in FIG. 21. The primary selection screen 2100 defaults to displaying the current hour, and information pertaining to all control records. Pressing the ENTER key shows the most recent activity. If the current time is within the first ten minutes of the hour, all records updated since the previous half hour will be selected.

Additionally, there is a display of record counts for PO and PQ type records. This display shows the number of PO records for status 1, 2, 3, 4, 8 and 9, and for all PQ records. This is valuable because the goal of the processes is to keep the number of PO records (representing work which is available and needs to be finished) to a minimum. The count of PQ records shows work that is waiting but is not yet available for processing. The screen displays and allows entry of file type, batch number, serial number, ABAP name, the last update time and client information.

The default file type selection is P*, indicating all control records. When this default selection is invoked, bulk data records and the interface system control record are skipped, and may only be selected by specific reference.

In addition to this default selection, any single file type may be selected including bulk data types (PZ and P0), and the master control record 154 (PC). If an asterisk is used in the first character of a batch number, all records are selected which meet the other selection criteria. The user may also select one specific batch.

Omitting a value in the serial number field selects all records which meet the other selection criteria. If a number is entered in this field, only those batches that are greater than or equal to that number will be selected. The ABAP field represents the specific data format. Again, an asterisk in the first character of this field will select all records that meet the other selection criteria. The only other option is to select one specified format may also be selected.

Log file 122 is 'client' independent. Users can define 'client' in the transaction processing system in terms of a business unit such as a separate company, or division, or branch, etc. However, interface system 100 does submit triggers to specific clients, and it is possible to narrow the search based on a client. An asterisk entered in the client field will select all clients.

Once information is entered into primary selection screen 2100 indicating a selection, a list screen shows the results of this selection. FIG. 20 is a diagram illustrating the list screen according to the present invention.

Referring to FIG. 20, this list screen 2000 and related functions will now be described. Near the bottom of list screen 2000 are the numbers 0001/0048.

This indicates that 448 records met the selection criteria, and the screen starts with record 1. At this point, it is possible for a user to manually enter a first value in place of 0001 and jump to a specific place in the list. Additionally, the screen may be browsed using the usual SAP function keys. These SAP functions keys, which are familiar to one of ordinary skill in the art, conform to generally accepted Common User Access (CUA) standards as defined by IBM System Application Architecture Specification, are PF21, PF22, PF23, and PF24.

Placing the cursor on any line and pressing PF2, brings up additional detail for that record. According to the present invention, it is possible to browse backward and forward in time, jump to data records for a bulk control record, and jump to other screens specific to SAP's mode of processing.

As an example, consider placing the cursor on line 4 and pressing PF2, this result is shown in FIG. 12. FIG. 12 illustrates a detail header screen 1200 for a specific control record. In addition to information displayed in detail header screen 1200, the ABAP which reported the first status update and its version date and time stamp are shown as well.

If the file type PC is entered on the primary selection screen, a special format screen called a control record PC screen is displayed. FIG. 13 illustrates a control record PC screen 1300 according to the present invention. Referring to FIG. 13, in the top section of the control record PC screen 1300, time stamps indicate the date and time of the last reorganization of the file, the last time the interface system startup ran, and the last time the monitor process module ran.

In the middle section of control record PC screen 1300, all of the switches and counters for the interface system are displayed.

In the bottom section of control record PC screen 1300, version control information for the COBOL modules is presented. This information include the date and time the process module was compiled, and the number of times it has been executed since CICS was started up.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for implementing an interface system between an external process that sends an input message and a transaction processing system that receives and processes the input message, the method comprising the steps of:

(a) receiving at the interface system the input message from the external process;

(b) creating a control record which is indicative of the input message received by the interface system;

(c) writing said control record to an interface system log file in the interface system to log receipt of the input message by the interface system;

(d) confirming receipt of the input message to the external process to indicate that the input message has been received and logged by the interface system;

(e) scanning said interface system log file to detect said control record and triggering the transaction processing system in response to said detection of said control record; and (f) providing, via said control record, data from the input message to the transaction processing system so that the transaction processing system can receive and act on the input message.

2. The method of claim 1, further comprising the steps of:

(g) receiving at the interface system a processing status message from the transaction processing system to indicate a processing status of the input message in the transaction processing system;

(h) updating said interface system log file based on said processing status message received by the interface system;

(i) reading said control record in said interface system log file to determine a processing status of the input message and to determine if an output message is to be sent by the interface system;

(j) storing an outbound control record in a communications log file in the interface system based on said step (i); and (k) transmitting said output message from the interface system to a destination designated by said outbound control record, wherein said output message includes one of an output data message and an output status message.

3. The method of claim 1, wherein said step (a) comprises the steps of:

initializing an input receive subsystem in the interface system;

receiving the input message in said input receive subsystem;

validating and initializing an interface system status code indicative of processing performed on the input message; and updating said interface system status code to indicate that said input receive subsystem has completed its processing of the input message.

4. The method of claim 1, wherein said step (e) comprises the steps of:

browsing said interface system log file for active control records;

generating a trigger message indicating the input message has been received by the interface system and logged to said interface system log file and indicating the location of said control record created upon logging receipt of the input message; and sending said trigger message from the interface system to the transaction processing system.

5. The method of claim 4, further comprising the steps of:

initializing an Online Data Communications (ODC) queue counter to zero;

determining whether said ODC queue counter exceeds a predetermined threshold before generating said trigger message;

incrementing said ODC queue counter upon sending said trigger message; and continuing to browse said interface system log file until no more said active control records are found.

6. The method of claim 5, further comprising the steps of:

checking said interface system status code to determine whether a trigger message should be sent; and incrementing said ODC queue counter for each said active control record awaiting processing by the transaction processing system according to said interface system status code.

7. The method of claim 2, wherein said step (h) further comprises the steps of:

determining whether said processing status message contains one of an update to an existing control record, a new control record, and an update to a master control record;

writing said new control record as a control record in said interface system log file if said processing status message is said new control record;

retrieving and updating an existing control record from said interface system log file if said processing status message is said update to an existing control record; and retrieving and updating said master control record in said interface system log file if said processing status message is said update to a master control record.

8. A method for implementing an interface system between an external process that sends an input message and a transaction processing system that receives and processes the input message, the method comprising the steps of:

(a) receiving at the interface system the input message from the external process;

(b) creating a control record which is indicative of the input message received by the interface system;

(c) writing said control record to an interface system log file in the interface system to log receipt of the input message by the interface system;

(d) confirming receipt of the input message to the external process to indicate that the input message has been received and logged by the interface system;

(e) scanning said interface system log file to detect said control record and triggering the transaction processing system in response to said detection of said control record;

(f) providing, via said control record, data from the input message to the transaction processing system so that the transaction processing system can receive and act on the input message;

(g) receiving at the interface system a processing status message from the transaction processing system to indicate a processing status of the input message in the transaction processing system;

(h) updating said interface system log file based on said processing status message received by the interface system;

(i) reading said control record in said interface system log file to determine a processing status of the input message and to determine if an output message is to be sent by the interface system;

(j) storing an outbound control record in a communications log file in the interface system based on said step (i);

(k) transmitting said output message from the interface system to a destination designated by said outbound control record, wherein said output message includes one of an output data message and an output status message;

(l) browsing a transaction processing system log file in the interface system in an area defined by a previous end-of-file marker and a current end-of-file marker to find a transaction record corresponding to said control record; and (m) adding a match record which contains an address of said found transaction record to a match file in the interface system.

9. The method of claim 8, wherein said step (i) comprises the steps of:

browsing said interface system log file to find said control record;

browsing said match file to locate said match record corresponding to said found control record;

changing an interface system status code and a file type of said found control record to create a finished control record;

replacing said found control record with said finished control record.

10. The method of claim 9, further comprising the steps of:

reading a transaction processing system status if said match record is found;

reading said transaction processing system log file if said transaction processing system status is pending;

determining if said control record has timed out; and changing said interface system status code and said file type of said control record to create a finished control record if said control record has timed out.

11. The method of claim 9, wherein said step (j) comprises the step of writing said finished control record as an outbound control record to said communications log file.

12. A method for implementing an interface system between an external process that sends an input message and a transaction processing system that receives and processes the input message, the method comprising the steps of:

(a) receiving at the interface system the input message from the external process;

(b) creating a control record which is indicative of the input message received by the interface system;

(c) writing said control record to an interface system log file in the interface system to log receipt of the input message by the interface system;

(d) confirming receipt of the input message to the external process to indicate that the input message has been received and logged by the interface system;

(e) scanning said interface system log file to detect said control record and triggering the transaction processing system in response to said detection of said control record;

(f) providing, via said control record, data from the input message to the transaction processing system so that the transaction processing system can receive and process the input message;

(g) receiving at the interface system a processing status message from the transaction processing system to indicate a processing status of the input message in the transaction processing system;

(h) updating said interface system log file based on said processing status message received by the interface system;

(i) reading said control record in said interface system log file to determine a processing status of the input message and to determine if an output message is to be sent by the interface system;

(j) storing an outbound control record in a communications log file in the interface system based on said step (i); and (k) transmitting said output message from the interface system to a destination designated by said outbound control record, wherein said output message includes one of an output data message and an output status message;

wherein said step (k) comprises the steps of:

receiving at the interface system one of said output data record and said output control record from the transaction processing system;

adding said received output control record to said interface system log file;

changing an interface system status code and a file type of said output control record to create a finished output control record;

writing said finished output control record as an outbound control record to an outbound communications log file in the interface system;

browsing said outbound communications log file to find said outbound control record;

establishing a communications link between the interface system and a destination node addressed by said outbound control record;

sending said outbound control record from the interface system to said destination node; and sending said output data record from the interface system to said destination node.

13. A method for implementing an interface system between an external process that sends an input message and a transaction processing system that receives and processes the input message, the method comprising the steps of:

(a) receiving at the interface system the input message from the external process;

(b) creating a control record which is indicative of the input message received by the interface system;

(c) writing said control record to an interface system log file in the interface system to log receipt of the input message by the interface system;

(d) confirming receipt of the input message to the external process to indicate that the input message has been received and logged by the interface system;

(e) scanning said interface system log file to detect said control record and triggering the transaction processing system in response to said detection of said control record;

(f) providing, via said control record, data from the input message to the transaction processing system so that the transaction processing system can receive and process the input message;

(g) receiving at the interface system a processing status message from the transaction processing system to indicate a processing status of the input message in the transaction processing system;

(h) updating said interface system log file based on said processing status message received by the interface system;

(i) reading said control record in said interface system log file to determine a processing status of the input message and to determine if an output message is to be sent by the interface system;

(j) storing an outbound control record in a communications log file in the interface system based on said step (i); and (k) transmitting said output message from the interface system to a destination designated by said outbound control record, wherein said output message includes one of an output data message and an output status message;

wherein said step (k) comprises the steps of:

creating and storing said outbound control record in said communications log file;

determining whether a destination address field of said outbound control record contains a direct address;

establishing a link between the interface system and an external process designated by said address;

creating an output message based on said outbound control record; and sending from the interface system said output message to said external process.

14. The method of claim 13, wherein said sending step comprises the steps of attempting to connect to a first external node based on a first destination address, and, if unsuccessful, then attempting to connect to a second external node based on a second destination address.

15. The method of claim 14, further comprising the steps of:

detecting whether a transmission error has occurred;

re-sending said output message from said interface system if said transmission error has occurred;

counting a number of attempts to send said output message;

deleting said output message from said communications log file if said number of attempts exceeds a threshold limit; and changing a file type of said outbound control record if said number of attempts exceeds a threshold limit to create a finished outbound control record.

16. The method of claim 11, further comprising the step of deleting said outbound control record from said communications log file once said output message has been sent error free.

17. The method of claim 11, further comprising the steps of:

browsing said communications log file and sending first, middle, and last records of a chain mail sequence if said outbound control record is a last control record of a finite chain;

sending said outbound control record from said communications log file to a communications subsystem in the interface system;

sending said data records from said interface system log file to said communications subsystem;

deleting said outbound control record from said communications log file; and updating said interface system status code of said control record to reflect that processing of said communications subsystem is complete.

18. A method for implementing an interface system between an external process that sends an input message and a transaction processing system that receives and processes the input message, the method comprising the steps of:

(a) receiving at the interface system the input message from the external process;

(b) creating a control record which is indicative of the input message received by the interface system;

(c) writing said control record to an interface system log file in the interface system to log receipt of the input message by the interface system;

(d) confirming receipt of the input message to the external process to indicate that the input message has been received and logged by the interface system;

(e) scanning said interface system log file to detect said control record and triggering the transaction processing system in response to said detection of said control record;

(f) providing, via said control record, data from the input message to the transaction processing system so that the transaction processing system can receive and process the input message;

(g) receiving at the interface system a processing status message from the transaction processing system to indicate a processing status of the input message in the transaction processing system;

(h) updating said interface system log file based on said processing status message received by the interface system;

(i) reading said control record in said interface system log file to determine a processing status of the input message and to determine if an output message is to be sent by the interface system;

(j) storing an outbound control record in a communications log file in the interface system based on said step (i); and (k) transmitting said output message from the interface system to a destination designated by said outbound control record, wherein said output message includes one of an output data message and an output status message;

(l) browsing said communications log file to search for said outbound control record;

(m) checking a master control record to determine whether a number of communications tasks has exceeded a threshold, if said outbound control record is found;

(n) checking whether a communications node pointed to by said outbound control record is available; and (o) starting a communications process in the interface system for said communications node.

19. A system for interfacing an external process that sends an input message and a transaction processing system that receives and processes the input message, the system comprising:

(a) a log file for storing a control record and for providing, via said control record, data from the input message to the transaction processing system;

(b) first means, coupled to said log file, for receiving the input message from the external process and for logging receipt thereof to said log file;

(c) second means, coupled to said log file, for providing a trigger message to the transaction processing system to indicate that the input message has been received and logged by said first means;

(d) third means, coupled to said log file, for determining a processing status of the input message in the transaction processing system and for generating an outbound control record as a function of said status; and (e) fourth means, coupled to said third means, for creating an output message as a result of said outbound control record and for transmitting said output message to a destination.

20. The system of claim 19, further comprising a second log file, coupled to said third means and to said fourth means, for storing said outbound control record.

21. The system of claim 19, further comprising a file, coupled to said third means, for storing an index to a transaction processing system log file.

22. The system of claim 19, further comprising fifth means for retrieving a processing status message and for updating said first log file as a result of said processing status message.

23. The system of claim 20, further comprising fifth means for browsing said second log file to look for said outbound control record and for starting a communications task as a result of said outbound control record.

24. The system of claim 19, further comprising fifth means, coupled to said second and said third means, for initiating said second and said third means at timed periodic intervals.

25. The system of claim 19, further comprising an elapsed-time timer table to store time information on generation of timing strobes to initiate said second and third means.

26. A system for interfacing an external process to a transaction processing system:

(a) a first log file;

(b) a second log file;

(c) an input receive subsystem, coupled to said first log file, operable to receive an input message from the external process, to log a control record of such receipt onto said first log file, and to send a confirmation to the external process confirming receipt of said input message;

(d) a trigger subsystem, coupled to said first log file, operable to browse said first log file to search for said control record, and to provide a trigger message to the transaction processing system indicating an input message has been received and is ready for processing by the transaction processing system;

(e) a status subsystem, coupled to said first log file, operable to retrieve a processing status message from the transaction processing system and to update control record information on said first log file;

(f) an acknowledgement subsystem, coupled to said first log file and to said second log file, operable to determine a processing status of the input message by reading control records updated by said status subsystem, and to provide an outbound control record to said second log file for control records indicating that an acknowledgment is requested; and (g) a communications subsystem, coupled to said second log file, operable to retrieve said outbound control record and from said second log file, operable to create an output message from said outbound control record, and to send said output message to an external destination.

27. The system of claim 26, further comprising a match file, coupled to said acknowledgement subsystem, for providing an index to transaction records in the transaction processing system.

28. The system according to claim 26, further comprising a communications monitor subsystem, coupled to said second log file, operable to browse said second log file to search for said outbound control record, to determine if a communications task exists for each of said outbound control record, and to start a communications task where one does not already exist.

29. The system according to claim 28, further comprising a monitor subsystem, operable to provide an artificial initiating event to said acknowledgement subsystem, said trigger subsystem, and said communications monitor subsystem.

30. A method for implementing an interface system between an external process that sends an input message and a transaction processing system that receives and processes an input message, the method comprising the steps of:

(a) receiving at the interface system the input message from the external process;

(b) creating a control record which contains a header used to control processing of the input message and one of data from the input message and a pointer to said data;

(c) writing said control record to an interface system log file in the interface system to log receipt of the input message by the interface system;

(d) confirming receipt of the input message to the external process to indicate that the input message has been received and logged by the interface system;

(e) scanning said interface system log file to detect said control record and triggering the transaction processing system in response to said detection of said control record; and (f) providing, via said control record, said data to the transaction processing system so that the transaction processing system can process the input message without requiring further action by the external process.

* * * * *